United States Patent [19]
Sumio et al.

[11] Patent Number: 5,099,694
[45] Date of Patent: Mar. 31, 1992

[54] VIBRATION DETECTING APPARATUS

[75] Inventors: Hiroshi Sumio, Tokyo; Toru Nagata, Yokohama; Koichi Washisu, Tokyo; Masao Shikaumi, Yokohama, all of Japan

[73] Assignee: Canon Kabushiki Kaisha, Tokyo, Japan

[21] Appl. No.: 195,278

[22] Filed: May 18, 1988

[30] Foreign Application Priority Data

| May 19, 1987 | [JP] | Japan | 62-121493 |
| May 19, 1987 | [JP] | Japan | 62-121494 |
| Nov. 16, 1987 | [JP] | Japan | 62-289137 |

[51] Int. Cl.⁵ .................................. G01N 29/00
[52] U.S. Cl. ........................................ 73/654
[58] Field of Search ................ 328/127, 128, 167; 307/311; 358/222; 73/495, 496, 488, 503, 505, 510, 511, 602, 654, 658

[56] References Cited

U.S. PATENT DOCUMENTS

| 3,515,881 | 6/1970 | Philbrick et al. | 358/222 |
| 3,702,394 | 11/1972 | Rainsberger et al. | 328/127 |
| 3,978,416 | 8/1976 | Sutphin, Jr. | 328/167 |
| 3,979,090 | 9/1976 | Brickner et al. | 73/178 R |
| 4,114,117 | 9/1978 | Ford | 328/167 |
| 4,306,191 | 12/1981 | Bader | 328/127 |
| 4,738,264 | 4/1988 | Orlando | 73/654 |

FOREIGN PATENT DOCUMENTS

2116397 9/1983 United Kingdom .

OTHER PUBLICATIONS

Polonik, V. S., "Automatic Television Devices", translated from Pribory i Tekhnika Éksperimenta, No. 1, pp. 151–153, Jan./Feb. '79.

Primary Examiner—Hezron E. Williams
Assistant Examiner—Louis M. Arana
Attorney, Agent, or Firm—Fitzpatrick, Cella, Harper & Scinto

[57] ABSTRACT

The present invention discloses a vibration detecting apparatus for obtaining a signal indicating the speed or displacement of an object by integrating a signal generated by an acceleration meter or a speed-meter, equipped with an integrator with a variable lower limit frequency of the integrable frequency range or bandwidth, and a control unit for varying the lower limit frequency of the integrator according to a predetermined method in response to the input and/or output of the integrator.

13 Claims, 26 Drawing Sheets

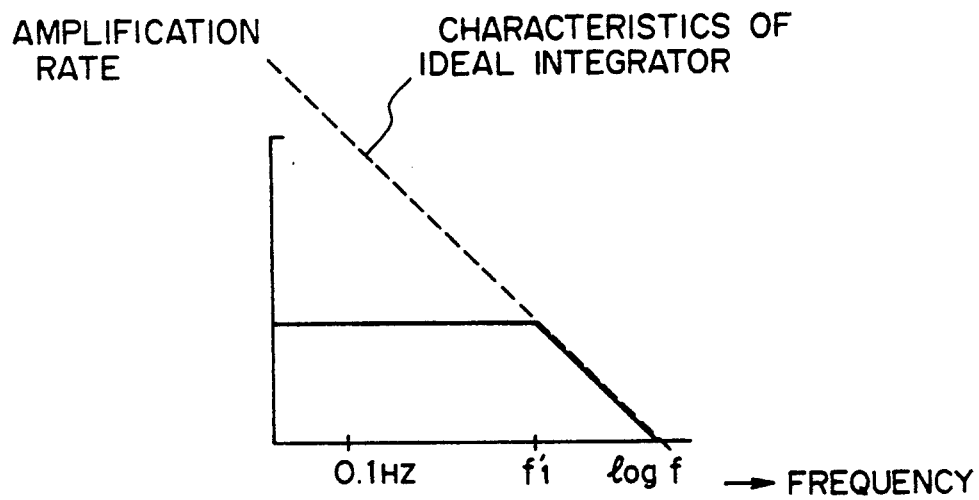
FIG. 20A
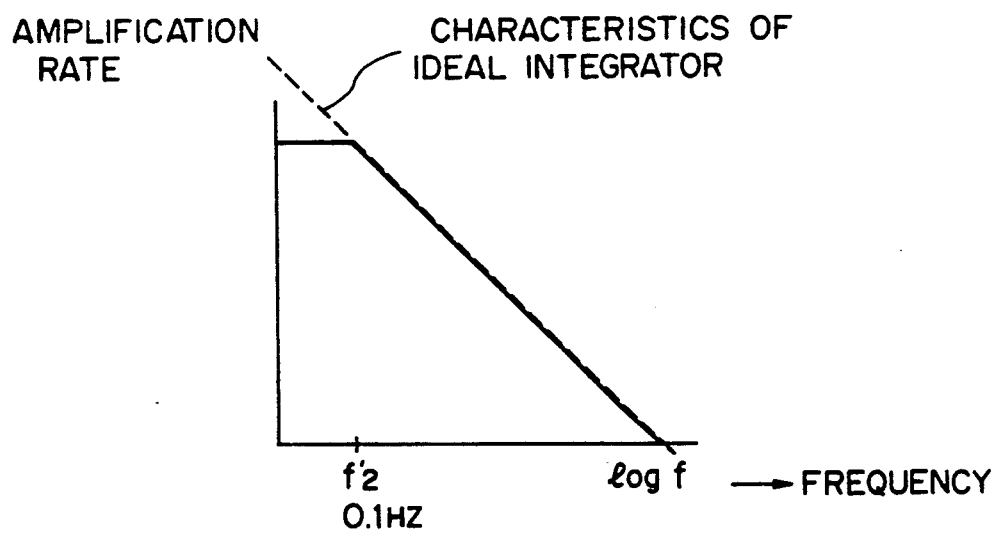
FIG. 20B
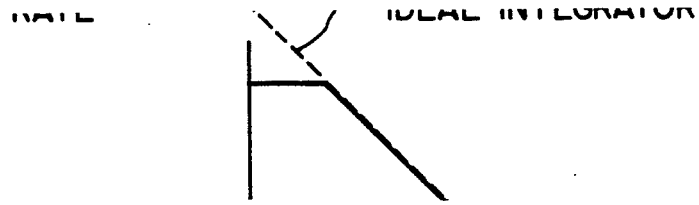

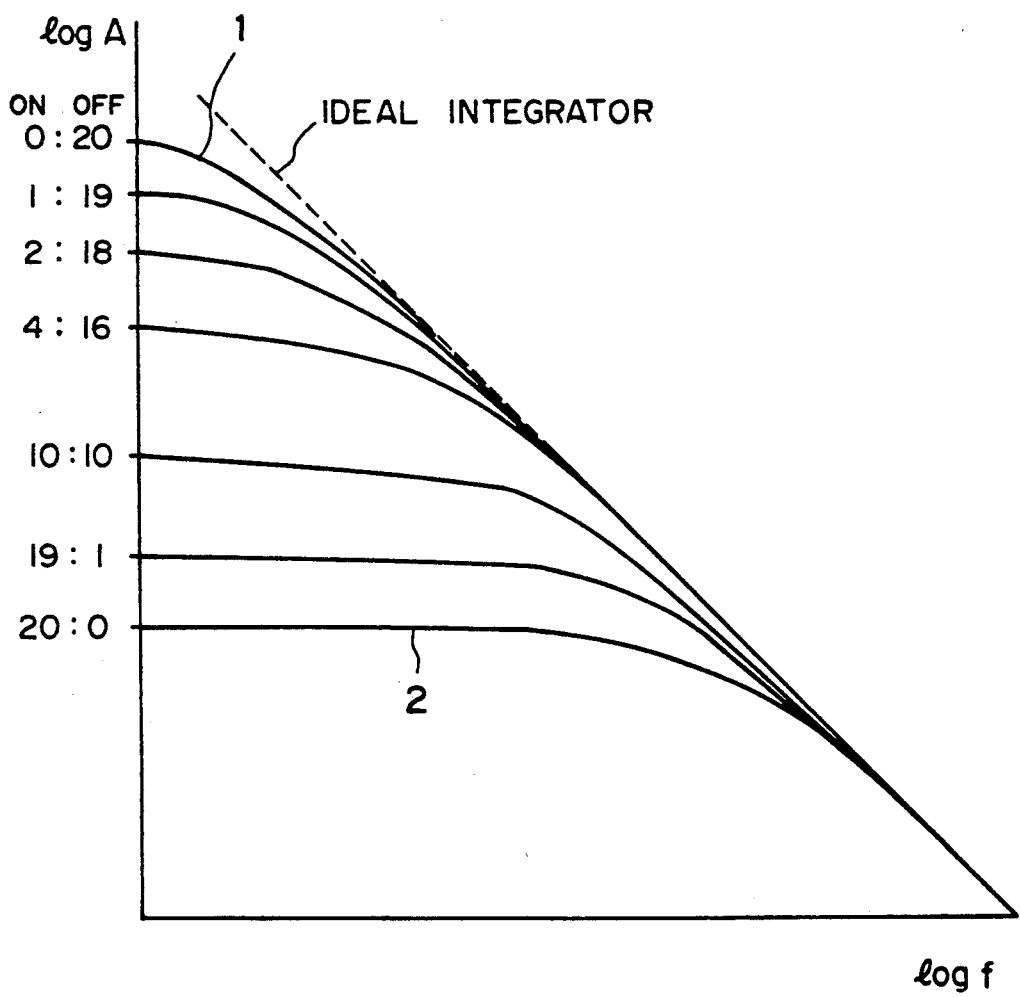
F I G. 36

VIBRATION DETECTING APPARATUS

BACKGROUND OF THE INVENTION

1. Field of the Invention

The present invention relates to a vibration detecting apparatus for use in the detection of vibration of an equipment subject to vibration of a relatively low frequency for example in a range from 1 to 30 Hz, and more particularly to a vibration detecting apparatus adapted to be loaded in an equipment such as camera and enabling to precisely and rapidly detect the vibration of said frequency range in said equipment.

2. Related Background Art

For detecting vibration, for example caused by hand shaking in a camera, it has been proposed, for example in the British Patent No. 2116397A, to install a vibration detecting apparatus incorporating an acceleration meter in the camera and to integrate the output of said acceleration meter indicating the acceleration once or twice with an integrating circuit to obtain the speed or the displacement by vibration.

FIG. 40 schematically shows a conventional method and apparatus for detecting the displacement of a camera caused by vibration. Such conventional method and apparatus for detecting camera vibrations have been associated with the following drawbacks.

Reference is made to FIGS. 40 to 43 in the following explanation of said drawbacks.

FIG. 40 illustrates a system for detecting the vertical vibration of the camera in a direction 4, and the system for detecting the lateral vibration perpendicular to the plane of drawing is omitted. In FIG. 40, there are shown a camera body 1; a camera lens 2; and two acceleration meters 3a, 3b such as servo acceleration meters, capable of detecting a small amount of acceleration respectively in directions 3a', 3b'. Similar acceleration meters can be used for detecting lateral vibration of the camera, and, in such case the acceleration is detected in directions which are 90° to the directions 3a', 3b', namely perpendicular to the plane of drawing.

There are also provided a differential amplifier 5 for obtaining the difference of outputs of the two acceleration meters 3a, 3b and an integrating circuit 6. Said integrating circuit 6 has a two-stage structure as shown in FIG. 41, in which the first stage converts the output of the differential amplifier, indicating the acceleration, into the speed, and the second stage converts the speed into the displacement, thus releasing a displacement signal 7.

In the unit (a) or (b) in FIG. 41, there are provided an operational amplifier 8; a resistor 9; and a capacitor 10. An input terminal 11 receives the output of the differential amplifier 5, and an output terminal 12 releases a speed signal, while an output terminal 13 releases a displacement signal. In the integrating circuits of the first and second stages, the resistors 9 or the capacitors need not be mutually equal but can be suitably selected in order to obtain a high precision in the output in rapid manner.

A reset switch 14, when closed, short-circuits the capacitor 10 to interrupt the function of the integrating circuit, and, when opened, starts the integration by charging the capacitor 10.

Now reference is made again to FIG. 40, for explaining the vibration detecting operation. Let us consider a situation where the operator aims the camera at an object. In this state the camera causes small vibrations in the direction 4 and in the direction perpendicular to the plane of drawing. This vibration is principally a motion of acceleration, having a frequency in a range of 1 to 30 Hz. In FIG. 40, a camera vibration in the direction 4 gives different accelerations to the acceleration meters 3a, 3b. This is because, in case of a vibration around a point O, the acceleration is larger in the acceleration meter 3a which is farther from the point O than in the acceleration meter 3b which is closer to the point O. An acceleration signal representing the vertical vibration of the camera in the direction 4 can be obtained by determining the difference of the outputs of two acceleration meters 3a, 3b by means of the differential amplifier 5, and the vibrational displacement of the camera can be detected by integrating the output of said differential amplifier 5 by means of two-stage integrating circuit 6.

FIGS. 42A, and 42B illustrate the wave form of the acceleration signal and that of the speed signal obtained by integrating said acceleration signal, in the conventional vibration detecting apparatus as explained above. More specifically, FIG. 42A shows the ideal wave form, in the first-stage integrating circuit shown in FIG. 41(a), of the speed signal 16 at the output terminal 12 obtained by integrating the acceleration signal 15 received at the input terminal 11. In practice, however, because of the fluctuation in the precision of the acceleration meters 3a, 3b, the difference of the outputs of said acceleration meters from the differential amplifier 5 contains, as shown by the acceleration signal $15_1$ in FIG. 42B, a certain bias $20_1$, displaced from the zero point (indicated by arrow 19) of said acceleration signal. The integration of such acceleration signal $15_1$ will inevitably involve the integration of the above-mentioned bias, so that the accuracy of the speed signal $16_1$ after integration becomes significantly deteriorated as shown in FIG. 42B.

Consequently it has been proposed, as shown in FIG. 43, to serially connect a high-pass filter 21, shown in FIG. 44, between the differential amplifier 5 and the integrator 6, thereby removing the output of a very low frequency, for example less than 1 Hz, thus eliminating the bias component in the input signal to the integrator.

As shown in FIG. 44, said high-pass filter is composed of an input terminal 11 for receiving the acceleration signal containing a bias signal composed of a DC component and a low frequency component of a frequency less than 1 Hz; an RC serial circuit consisting of a resistor 9 and a capacitor 10 for cutting off the bias component; an RC parallel circuit consisting of a resistor 9 and a capacitor 10 for eliminating noises and determining the degree of amplification; an operational amplifier 8; and an output terminal 22 releasing the acceleration signal free from the bias component. Consequently the differential acceleration signal received at the input terminal 11 is subjected to the removal of the bias component in the high-pass filter 21, and is released as a corrected acceleration signal.

FIG. 45 shows the function of the high-pass filter 21. The acceleration signal $15_1$ supplied to the input terminal 11 contains a bias component $20_1$. By passing such input signal through the high-pass filter 21, there is obtained in the output terminal the corrected acceleration signal $15_2$ not containing the bias component.

However, as will be apparent from FIG. 45 showing the signal wave form, the corrected acceleration signal $15_2$ enters a stable area of elimination of the bias component at a time B after the lapse of a period τ from the start A of the input to the high-pass filter 21, and said stabilizing period τ is proportional to the product of the resistance and the capacitance of the RC serial circuit determining the high-pass time constant. In order to precisely detect the low frequency vibration of 1 to 30 Hz as in the camera vibration caused by hand shaking by completely removing the bias component, it is necessary to select a considerably large high-pass time constant, so that the above-mentioned period τ inevitably becomes considerably long.

Also the integrating circuit requires a very long time for restoring a normal operation once it is saturated by some reason. It is therefore known that the integrating circuit may require a stabilizing time as in the high-pass filter.

In the actual camera operation, such saturation of the integrating circuit tends to occur in photographing continuous pictures or panorama pictures. More specifically, the probability of saturation of the integrating circuit becomes very high when the camera is swung, after aimed at a first object, to another second object.

The presence of such waiting time for stabilizing the output in the high-pass filter and in the integrating circuit is heavily detrimental in the practical use.

SUMMARY OF THE INVENTION

In consideration of the foregoing, an object of the present invention is to provide a vibration detecting apparatus for detecting the vibration of an object by integrating a signal indicating the acceleration or speed of said object to obtain a signal indicating the speed or displacement thereof, comprising integrating means for said integration with a variable lower limit frequency of the integrable frequency range or bandwidth, and control means for varying said lower limit frequency of said integrating means according to the input signal to said integrating means, thereby enabling said integrating means to recover promptly from eventual saturation state by said control means and thus allowing to precisely detect the vibration without a long waiting time.

Other objects of the present invention will become fully apparent from the following description of the embodiments.

BRIEF DESCRIPTION OF THE DRAWINGS

FIGS. 20A and 20B are charts showing the change in the function characteristic of said integrator;

FIG. 36 is a chart showing the relationship between the degree of pulse width modulation and the cut-off frequency of the integrator in the apparatus shown in FIG. 32;

DETAILED DESCRIPTION OF THE PREFERRED EMBODIMENTS

Now the present invention will be clarified in detail by embodiments thereof shown in the attached drawings.

Figure 1:
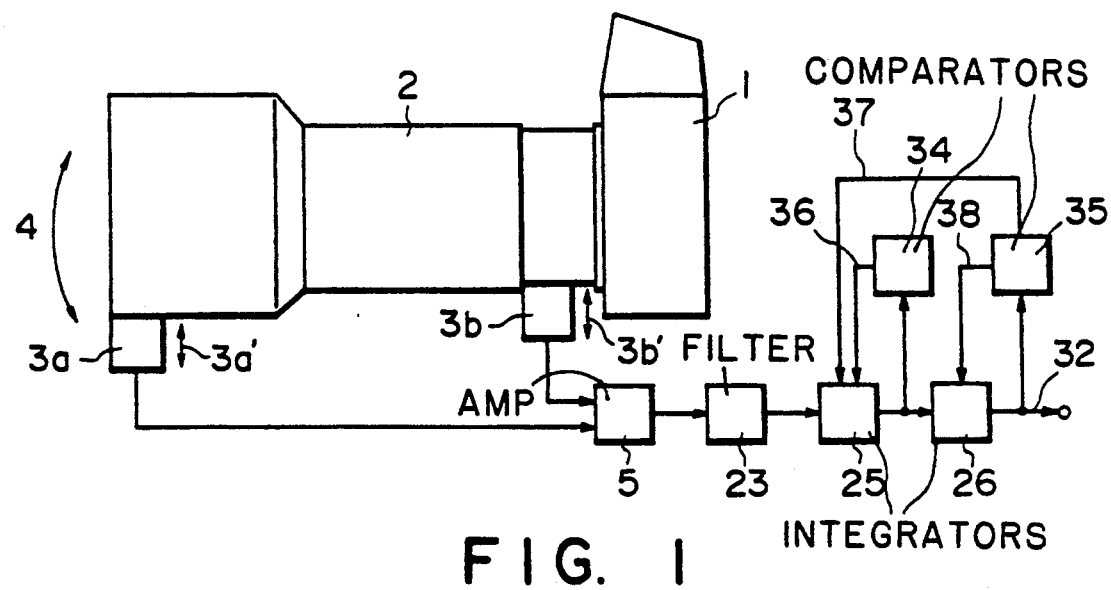
FIG. 1 is a schematic view of a vibration detecting apparatus constituting a first embodiment of the present invention.
Figure 40:
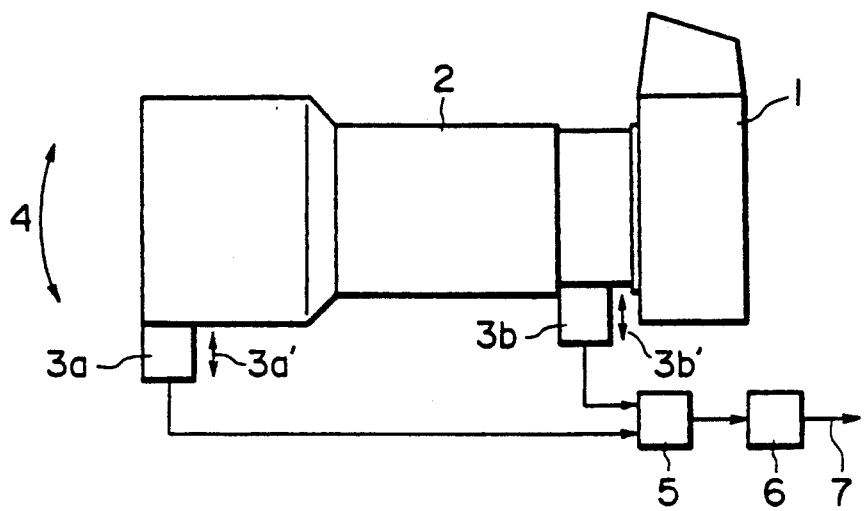
FIG. 40 is a schematic view of a conventional vibration detecting apparatus.
Figure 41:
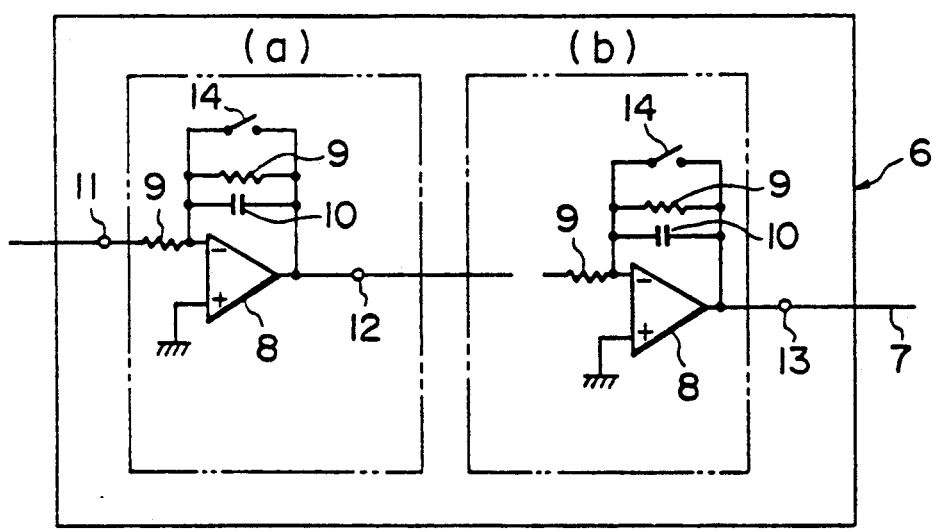
FIG. 41 is a circuit diagram of known integrators in the apparatus shown in FIG. 40.
Figure 42A:
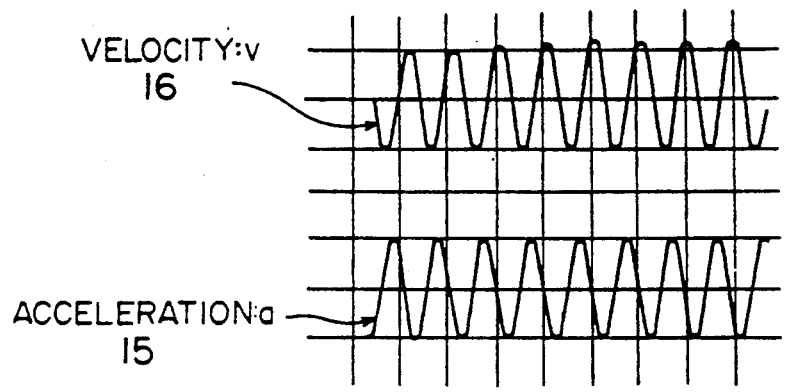
FIG. 42A and 42B are charts showing signals in the apparatus shown in FIG. 40.
Figure 42B:
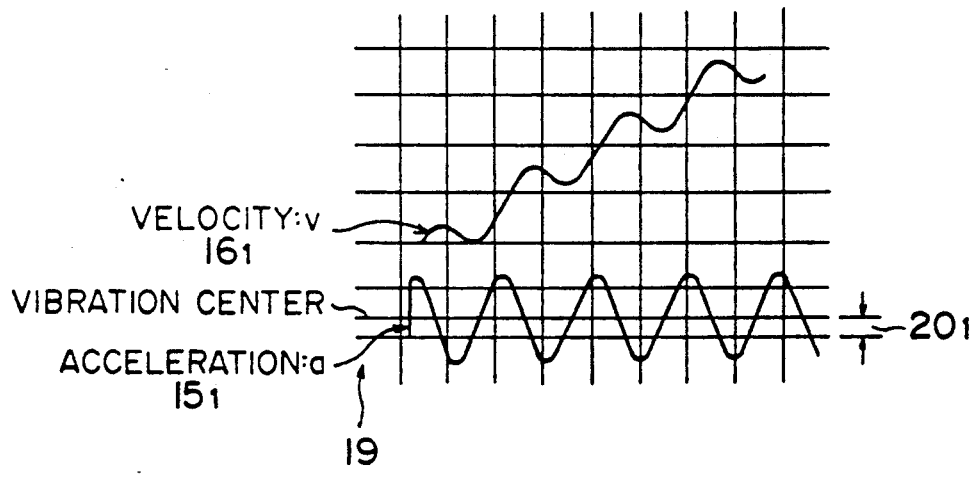
Figure 43:
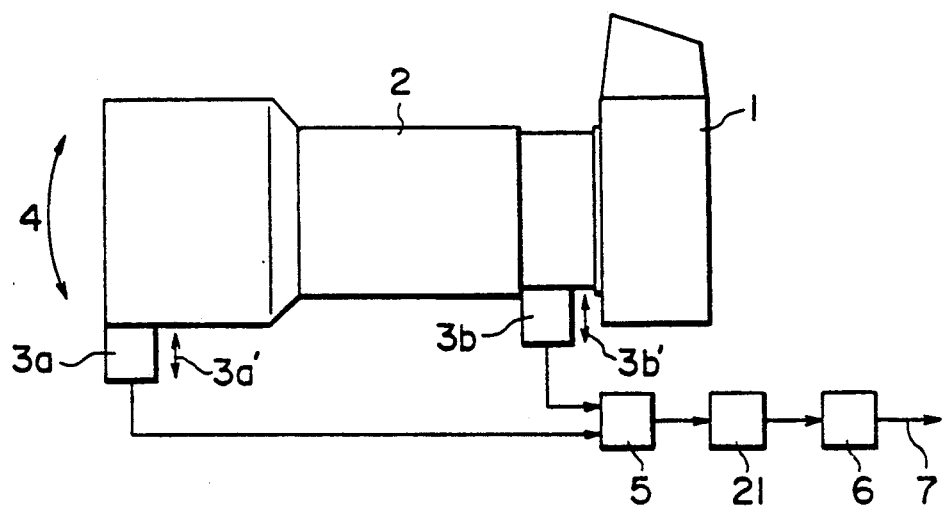
FIG. 43 is a schematic view of another conventional vibration detecting apparatus.
Figure 44:
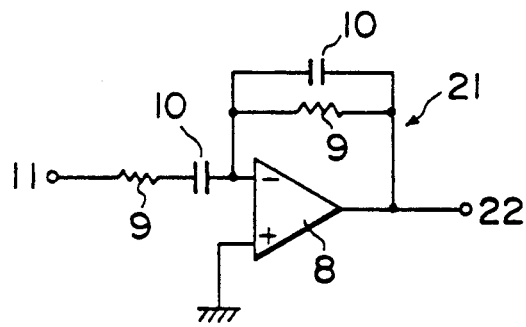
FIG. 44 is a circuit diagram of a high-pass filter contained in the apparatus shown in FIG. 43.
Figure 45:
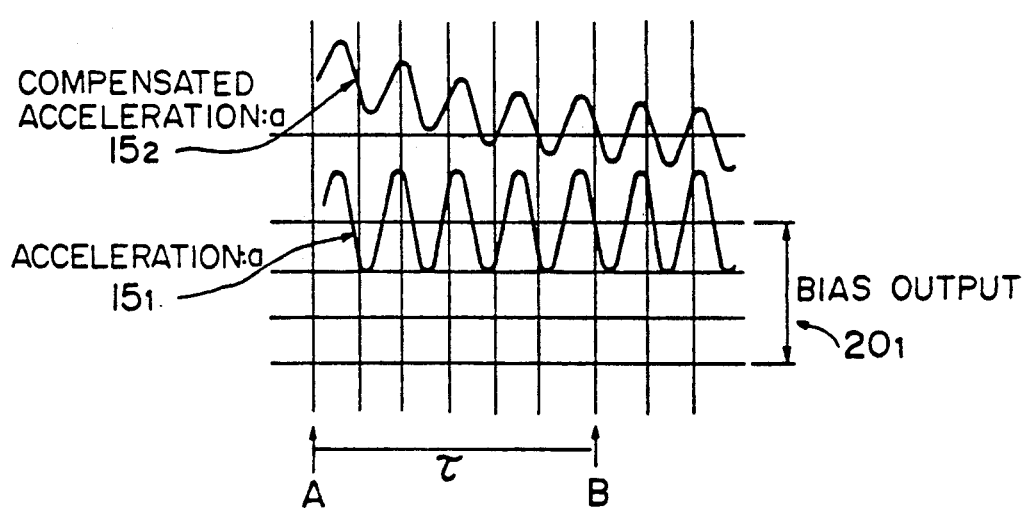
FIG. 45 is a chart showing signals in the vibration detecting apparatus shown in FIG. 43.

FIG. 1 shows the structure of a vibration detecting apparatus of the present invention, wherein same components as those in the conventional apparatus shown in FIG. 40 or 43 are represented by same numbers and will not be explained further.

Figure 2A:
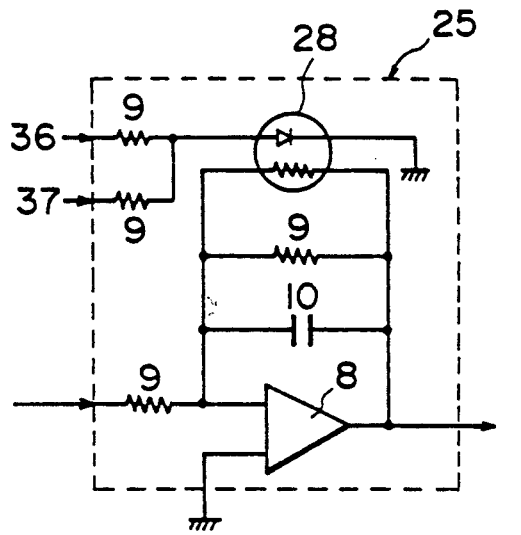
FIG. 2A is a circuit diagram showing an embodiment of a first integrator in the apparatus shown in FIG. 1.
Figure 2B:
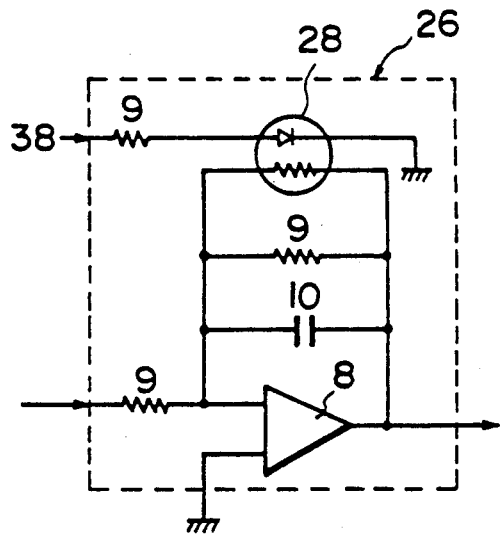
FIG. 2B is a circuit diagram showing an embodiment of a second integrator in said apparatus.
Figure 3:
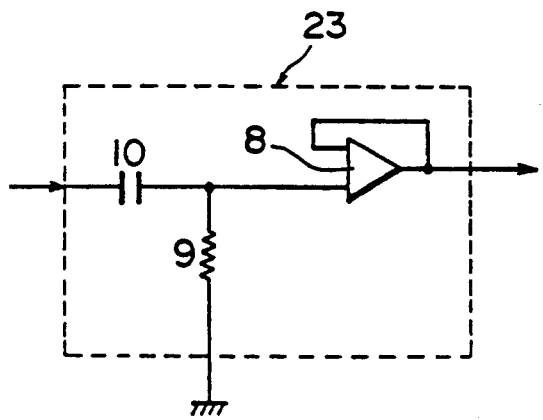
FIG. 3 is a circuit diagram showing a high-pass filter in the apparatus shown in FIG. 1.
Figure 7A:
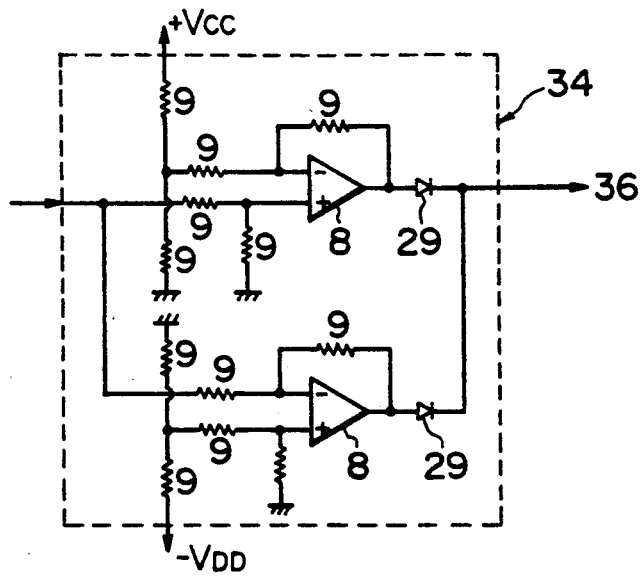
FIGS. 7A and 7B are circuit diagrams showing examples of differential window comparator in the apparatus shown in FIG. 1.
Figure 7B:
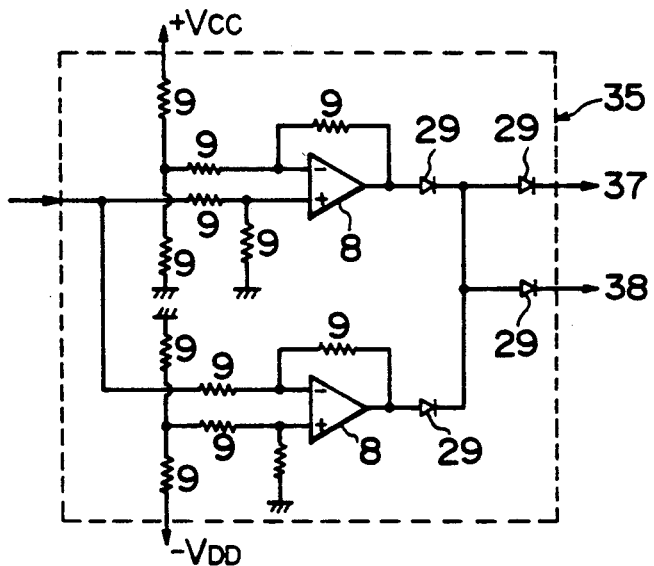

In FIG. 1 there are shown a known high-pass filter 23 of a structure as shown in FIG. 3; integrators 25, 26 of structures as shown in FIGS. 2A and 2B; a one-output differential window comparator 34 of a structure as shown in FIG. 7A; and a two-output differential window comparator 35 of a structure as shown in FIG. 7B. In FIGS. 2, 3 and 7 there are shown known operational amplifiers 8; resistors 9; capacitors 10; diodes 11; and photocouplers 28 each composed of a CdS element connected parallel to the operational amplifier 8 and a light-emitting diode (LED), but the circuit components of a same number may have different characteristics in these circuits.

In the vibration detecting apparatus shown in FIG. 1, output signals of acceleration meters 3a, 3b constituting detectors in said apparatus are subjected to a subtraction in a differential amplifier 5 to obtain an acceleration signal representing the difference of said output signals. Said acceleration signal is supplied to a high-pass filter 23 for eliminating the DC component and low-frequency components, and is then subjected to two integrations in integrators 25, 26 to obtain, from said integrator 26, a displacement signal 32 representing the displacement by vibration.

Figure 4:
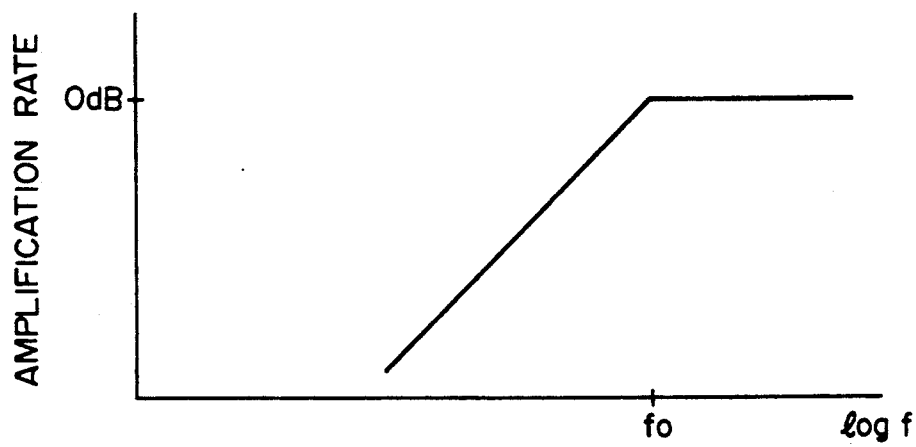
FIG. 4 is a characteristic chart of said high-pass filter.

FIG. 4 is the characteristic curve of said high-pass filter 23 having a cut-off frequency $f_0$.

The integrators 25, 26 constitute the principal part of the vibration detecting apparatus of the present invention in cooperation with two differential window comparators 34, 35 functioning as control means for controlling said integrators, and are characterized by a fact that the lower limit frequency of the integrable frequency range is rendered variable.

Figure 5:
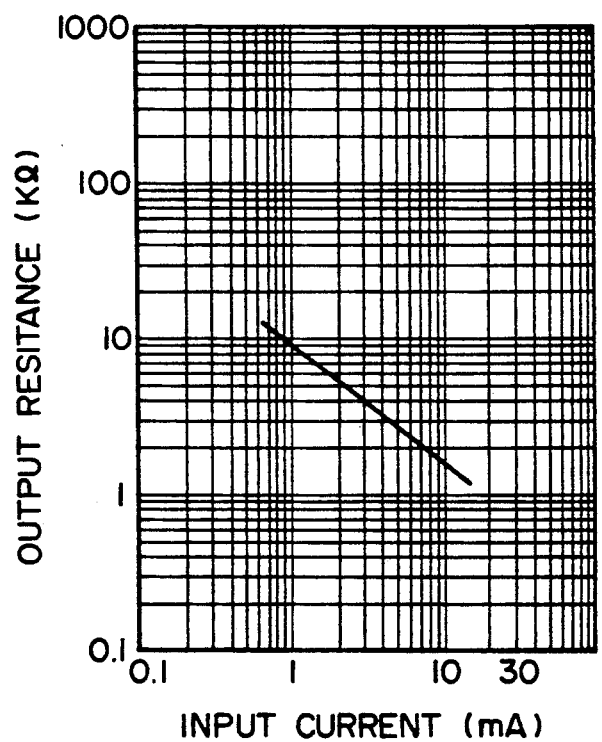
FIG. 5 is a characteristic chart of a CdS element constituting a photocoupler in the integrator shown in FIG. 2.

In said integrator 25 or 26, as shown in FIG. 2, the operational amplifier 8 is equipped, as a by-pass element, with a photocoupler 28 composed of a light-emitting diode and a CdS device, and said LED of the photocoupler 28 of the integrator 25 receives output signals 36, 37 of the differential window comparators 34, 35 while that of the integrator 26 receives an output signal 38 of the differential window comparator 35. The CdS device constituting the photocoupler 28 decreases the resistance in inverse proportion to the input current as shown in FIG. 5, so that the integrator 25 or 26 varies the time constant according to the output current of the differential window comparator 34 or 35, thus varying the lower limit frequency of the integration frequency range.

Figure 6A:
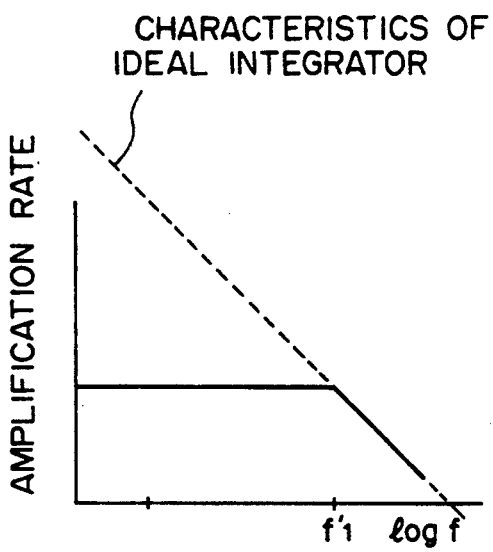
FIGS. 6A and 6B are Bode line charts showing the characteristics of the integrators shown in FIG. 2.
Figure 6B:
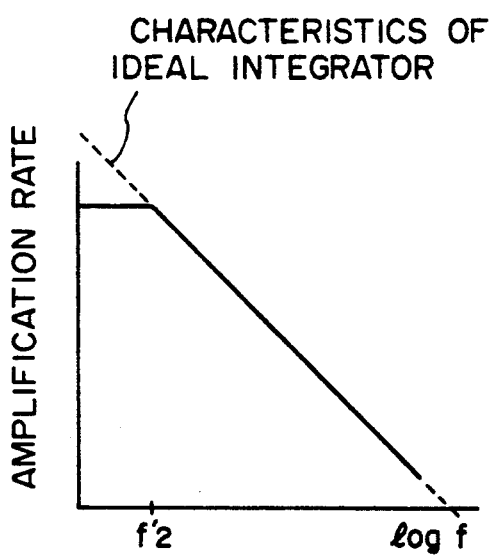

FIGS. 6A and 6B are Bode line charts of the characteristic of the integrator 25 (or 26) wherein broken lines indicate the characteristics of an ideal integrator.

The integrator 25 (or 26) of the present embodiment varies the characteristic continuously from a state shown in FIG. 6B to a state shown in FIG. 6A, depending on the output of the differential window comparator 34 (or 35). More specifically, the integrator 25 (or 26) functions with the characteristic shown in FIG. 6B when the CdS device of the photocoupler 28 has a high resistance (namely when the differential window comparators 34, 35 have a small output current), and functions with the characteristic shown in FIG. 6A when the CdS device has a low resistance (when said comparators 34, 35 have a large output current). Thus the lower limit frequency f of the integration frequency range of the integrator 25 or 26 varies from $f_2'$ shown in FIG. 6B to $f_1'$ shown in FIG. 6A. Said lower limit frequency f is represented by $f = 1/2\pi CR$ wherein R is the synthesized resistance of the bypass resistance of the operational amplifier 8 and the resistance of the CdS device while C is the capacitance of the capacitor 10 parallel to the operational amplifier 8. In the present embodiment, $f_2'$ is selected equal to 0.1 Hz or lower for exact detection of phase and amplitude of the camera vibration.

Figure 7C:
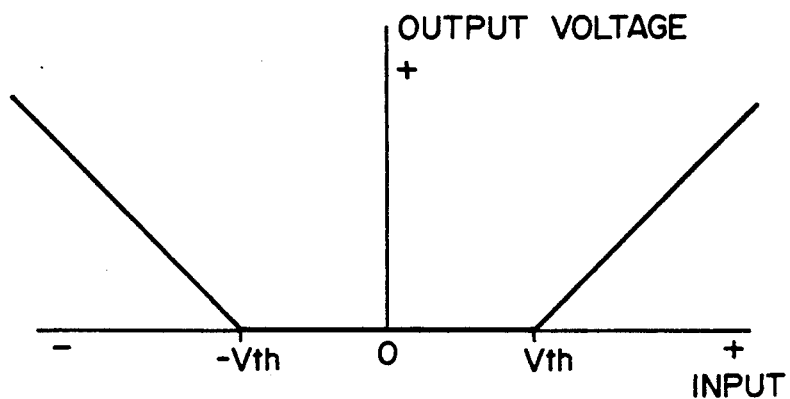
FIG. 7C is an output characteristic chart of said differential window comparator.

The differential window comparators 34, 35 for controlling the lower limit frequencies of the integrators 25, 26 have already known circuit structures as shown in FIGS. 7A and 7B, and have an input-output characteristic shown in FIG. 7C. Consequently the differential window comparator 34 or 35 provides a zero output voltage when the output voltage of the integrator 25 or 26 is in a predetermined range from $-V_{th}$ to $+V_{th}$, but generates an output voltage shown in FIG. 7C when the output signal of said integrator is outside said range, and a current corresponding to said output voltage is supplied to the LED of the photocoupler of the integrator 25 or 26.

In the following there will be explained the function of the vibration detecting apparatus of the present embodiment, while making reference to FIGS. 1 to 7.

When the camera equipped with the vibration detecting apparatus shown in FIG. 1 generates a vibration in a direction 4 due to hand shaking while it is aimed at an object in a first direction, the local vibrations at two points of the camera are converted, by two acceleration meters 3a, 3b, into local angular acceleration signals, which are supplied to the differential amplifier 5. Said amplifier 5 supplies the high-pass filter 23 with an angular acceleration signal of said camera, represented by the difference of two local angular acceleration signals. The high-pass filter 23 eliminates the DC components, resulting for example from the offset voltages in the acceleration meters, from the angular acceleration signal supplied thereto, thereby supplying the first integrator 25 with an angular acceleration signal free from such DC components. If the camera is simply held at a certain direction, the camera only experiences a vibration of 1-30 Hz caused by hand shaking, so that the integrator 25 functions properly and does not show saturation as the voltage supplied thereto does not contain the DC components.

The output of the integrator 25, representing the angular velocity, is supplied not only to the second integrator 26 but also to the differential window comparator 34, which does not generate the range from $-V_{th}$ to $+V_{th}$ as shown in FIG. 7C. Said comparator 34 is so designed that the output voltage of the integrator 25 always falls in said range when the camera experiences only the vibration caused by hand shaking. In such case, therefore, the LED in the photocoupler 28 of the integrator 25 is not given any current. Thus the CdS device of said photocoupler 28 is maintained at the highest resistance value thereof, corresponding to the left end position in the characteristic chart of CdS device shown in FIG. 5. Consequently the CR parallel circuit of the integrator 25 shows the largest time constant, and the integrator 25 functions as shown in FIG. 6B. Thus the lower limit frequency of the integration range of the integrator 25 in this case becomes equal to $f_2'$, which is equal to or lower than 0.1 Hz in the present embodiment, and the integrator 25 is capable of integration in a wide frequency range above $f_2'$.

On the other hand, the output signal 32 of the second integrator 26, representing angular displacement, is supplied from the output terminal of the vibration detecting apparatus to an unrepresented vibration preventing apparatus and also supplied to the differential window comparator 35, which discriminates the function of the integrator 26 and controls the function of the integrators 25, 26 in a similar manner as the comparator 34. The integrator 26 is so designed that the output voltage thereof always fall in a predetermined voltage range from $-V_{th}$ to $+V_{th}$ of the window comparator 35 if the camera is subjected only to a vibration caused by hand shaking. Consequently the comparator 35 does not generate the output voltages 37, 38, so that the LED's in the photocouplers 28 of the integrators 25, 26 are not given currents. Consequently the CR parallel circuits in the integrators 25, 26 are maintained at the maximum time constants and the integrators 25, 26 function as shown in FIG. 6B, with the lower limit frequency $f_2'$ of the integration range. Since the vibration caused by hand shaking has a frequency range of 1 to 30 Hz, the integrators execute precise integration for the vibration caused by hand shaking, and the output terminal of the integrator 26 provides an output signal exactly representing the displacement resulting from said vibration. It makes sometimes the integrator saturate that when the output signal of the integrator has an offset error by clipping of the output signal of the acceleration meter which is caused by an excessive acceleration when the camera is directed from a direction to different direction, or when the output signal of the integrator has an offset error if the average of velocity is not equal to zero. The integrator 25, which therefore provides an output voltage outside the aforementioned voltage range from $-V_{th}$ to $+V_{th}$ of the differential window comparator 34. Consequently the output terminal of said comparator 34 generates an output voltage 36 which is proportional to the excess of said output voltage of integrator 25 beyond the limit $-V_{th}$ or $+V_{th}$. and a current corresponding to said output voltage 36 is given to the LED in the photocoupler 28 of the integrator 25. Consequently the resistance of the CdS device of said photocoupler 28 is reduced according to the characteristic chart shown in FIG. 5, thus decreasing the time constant of the CR parallel circuit in said integrator 25, whereby the function characteristic of said integrator 25 varies continuously from the state in FIG. 6B toward the state in FIG. 6A. Thus the lower limit frequency of the integrable frequency range of said integrator 25 changes from $f_2'$ shown in FIG. 6B toward $f_1'$ shown in FIG. 6A and assumes a value higher than $f_2'$.

Such change of the lower limit frequency of the integration range of the integrator 25 toward a higher frequency restores the saturated state of said integrator 25 to the unsaturated state, whereby the output of the integrator 25 returns to the range from $-V_{th}$ to $+V_{th}$. Thus the output of the differential window comparator 34 returns to zero, whereby the function characteristic of the integrator 25 returns to the state shown in FIG. 6B.

Even when the output voltage of the integrator 25 is within the predetermined voltage range of $-V_{th} \sim +V_{th}$, the output voltage of the integrator 26 may be positioned outside the predetermined voltage range $-V_{th} \sim +V_{th}$ of the differential window comparator 35. In such case the integrator 25 is not saturated but the integrator 26 is saturated, so that an exact angular displacement signal cannot be obtained at the output terminal of the vibration detecting apparatus.

In the present embodiment, when the integrator 26 becomes saturated and provides an output exceeding the predetermined range of the differential window comparator 35, said comparator 35 supplies the integrators 25, 26 with output voltages 37, 38 to change the lower limit frequency of the integration frequency range of the integrator 25 from $f_2'$ in FIG. 6B toward $f_1'$ in FIG. 6A, and the lower limit frequency of the integrator 26 also from $f_2'$ in FIG. 6B toward $f_1'$ in FIG. 6A, whereby the saturation of the integrator 26 is also resolved.

In the vibration detecting apparatus of the present embodiment explained above, even if the integrator 25 or 26 becomes saturated by the swinging motion of the camera, such saturation state is detected by the differential window comparators 34, 35 and is promptly resolved by a change in the integrable frequency range of the integrator, so that an exact output signal can be obtained from the output terminal of the vibration detecting apparatus without a long waiting time.

In the embodiment shown in FIG. 1, the integrators 25, 26 are controlled by a same differential window comparator 35, and the differential window comparators 34 and 35 have a same threshold value and a same output characteristic, but it may be advantageous to employ different control means for the integrator 25 and for the integrator 26.

Figure 8:
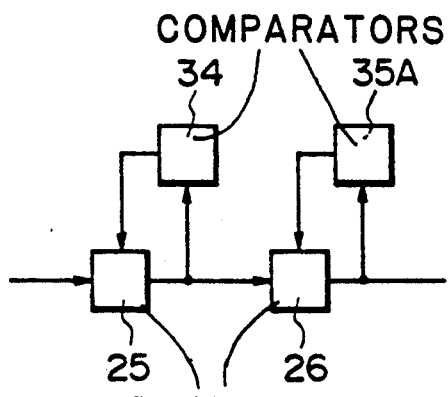
FIG. 8 is a block diagram showing the principal part of a second embodiment of the vibration detecting apparatus of the present invention.

FIG. 8 illustrates a modified embodiment on the structure of the integrator and the differential window comparator constituting control means therefor. In this embodiment the first integrator 25 is controlled only by the first differential window comparator 34 functioning by the output of said integrator 25, and the second integrator 26 is controlled only by the second differential window comparator 35A functioning by the output of said integrator 26. Also said comparators 34, 35A are so designed to have different threshold values and different output characteristics. Said comparator 35A is of one-output type shown in FIG. 7A, similar to the comparator 34.

Figure 9A:
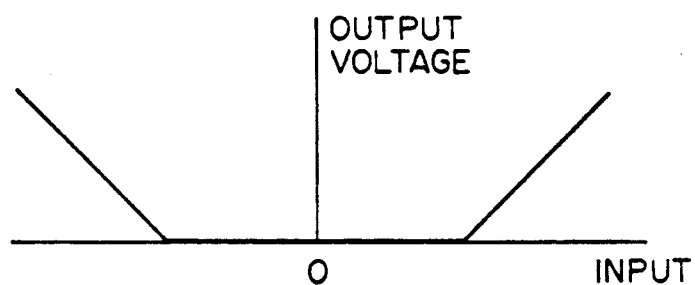
FIGS. 9A and 9B are output characteristic charts of a differential window comparator employed in the embodiment shown in FIG. 8.
Figure 9B:
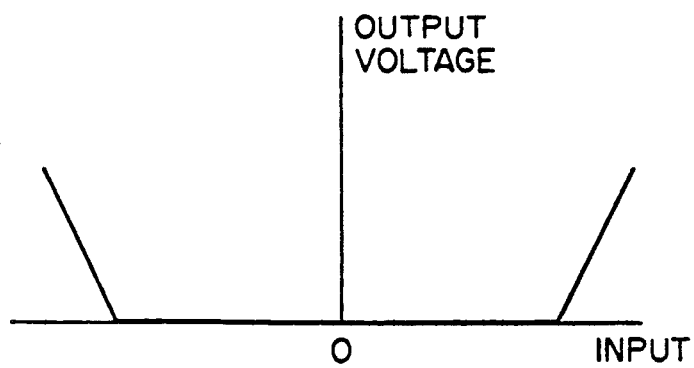

FIG. 9A shows the relationship between the threshold value and the output characteristic of said comparator 34, while FIG. 9B shows said relationship of the comparator 35A.

Figure 10:
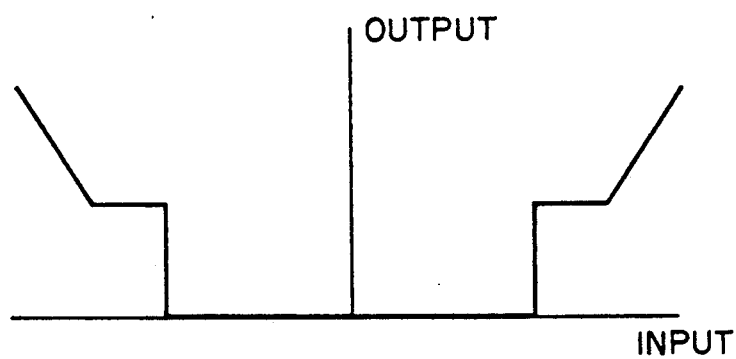
FIGS. 10 and 11 are characteristic charts of a differential window comparator in the embodiment shown in FIG. 8.
Figure 11:
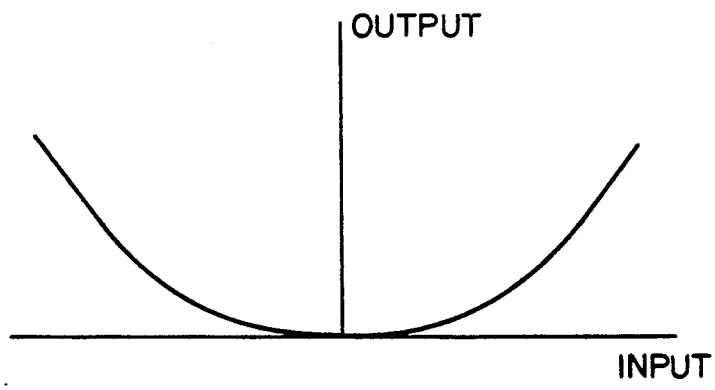

A structure in which each integrator is controlled by exclusive control means as shown in FIG. 8 provides a larger freedom in designing the output characteristic and threshold value of each control means. As an example, the output characteristics of the comparators 34, 35A may be selected respectively as shown in FIGS. 10 and 11.

Various modifications are possible with respect to the structure of the integrators 25, 26 and the differential window comparators 34, 35 serving as the control means therefor.

Figure 12:
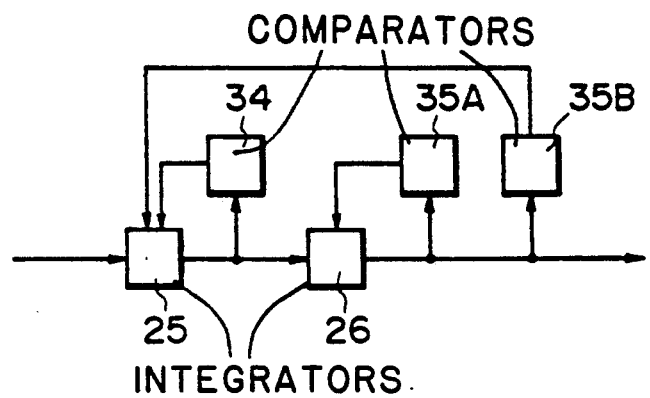
FIG. 12 is a block diagram showing the principal part of a third embodiment of the vibration detecting apparatus of the present invention.

FIG. 12 shows still another embodiment of the connection of the integrators and the differential window comparators serving as the control means therefor. This embodiment is a variation of the embodiment shown in FIG. 8, and is different therefrom in that the integrator 25 is controlled, in addition to the comparator 34, also by an exclusive differential window comparator 35B, which controls the integrator 25 in response to the output of the second integrator 26. Consequently, as in the embodiment shown in FIG. 1, the integrator 25 is controlled according to the outputs of the first and second integrators 25, 26.

Figure 13:
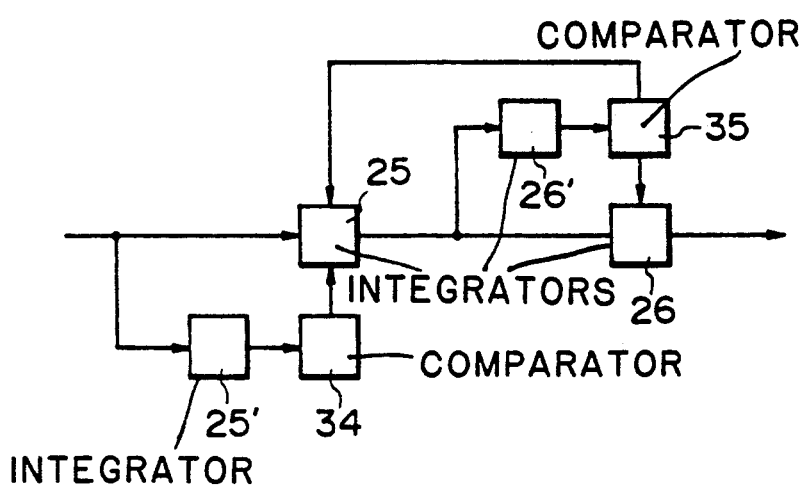
FIG. 13 is a block diagram showing the principal part of a fourth embodiment of the vibration detecting apparatus of the present invention.

In an embodiment shown in FIG. 13, in addition to the two integrators 25, 26 for integrating the output signal of the high-pass filter 23, there are provided two control integrators 25', 26' connected parallel to said integrators 25, 26, and two diffferential window comparators 34, 35 vary the lower limit frequency of the integration range of the integrators 25, 26 (namely time constants thereof) in response to the outputs of said control integrators 25', 26'.

In the present embodiment, therefore, the control means for the integrators 25, 26 are composed of the control integrators 25', 26' and the differential window comparators 34, 35. The comparator 35 is of two-output type shown in FIG. 7B, of which an output is used for controlling the integrator 25 while the other is used for the integrator 26.

In the embodiment shown in FIG. 13, the detection signal used for controlling the integrator 25 or 26 is taken into a control loop at the input point of said integrator. There is therefore formed a feed-forward control system rather than a feedback control system. For this reason, in comparison with the embodiments shown in FIGS. 1, 8 and 12, there are obtained a faster response to the input signal, a faster restoration from the saturated state of the integrators 25, 26 and a securer control for avoiding such saturated state. In the present embodiment which is capable of control by anticipation, control without saturation of the integrators 25, 26 can be achieved for example by inserting a function generator in the control means consisting of the control integrator and the differential window comparator in the control loop.

Figure 14:
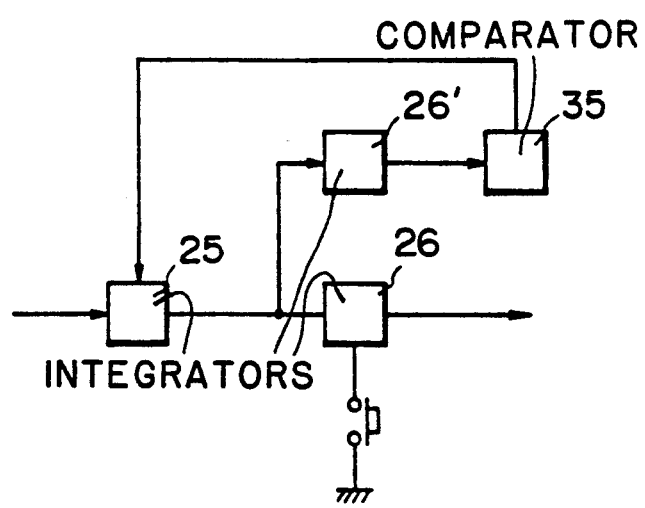
FIG. 14 is a block diagram showing the principal part of a fifth embodiment of the present invention.

FIG. 14 shows a principal portion of still another embodiment of the present invention, wherein the integrator 25 is controlled by a control integrator 26' and a differential window comparator 35, while the integrator 26 does not change the integrating characteristic thereof. In this structure, in case the output contains an offset error due for example to the saturation of the integrator 25, the differential window comparator 35 detects the resulting saturation of the integrator 26' and varies the integrating range of the integrator 25, thereby providing an exact speed signal in prompt manner.

The integrator 26 is similar t that shown in FIG. 16B and is not subjected to the change of time constant, but a stable integrated signal can be obtained relatively quickly by selecting the integrating range of the displacement output comparable to the amplitude of displacement caused by the hand shaking vibration. Also it is possible to prevent the saturation of the vibration detecting apparatus in the course of photographing operation by resetting the integrator 26 immediately before the photographing operation. In this manner it is rendered possible to obtain an inexpensive vibration detecting apparatus with a simplified circuit structure.

In the foregoing embodiments, the differential window comparators constituting control means for the integrators 25, 26 may naturally be replaced by circuits or control devices capable of achieving same controlling function, so that the control means is not limited to the differential window comparator.

Also in the foregoing embodiments the change of time constant of the integrator has been achieved by the CdS device, but such change can also be achieved by switching of plural parallel resistors, varying the resistance with a MOS FET or using a variable electrostatic capacitance. Any of these methods may be employed for varying the time constant, but it is preferable to vary only the lower limit frequency of the integrating range while maintaining a constant gain in said range. Also the integrator may be composed of a hardware.

Figure 15:
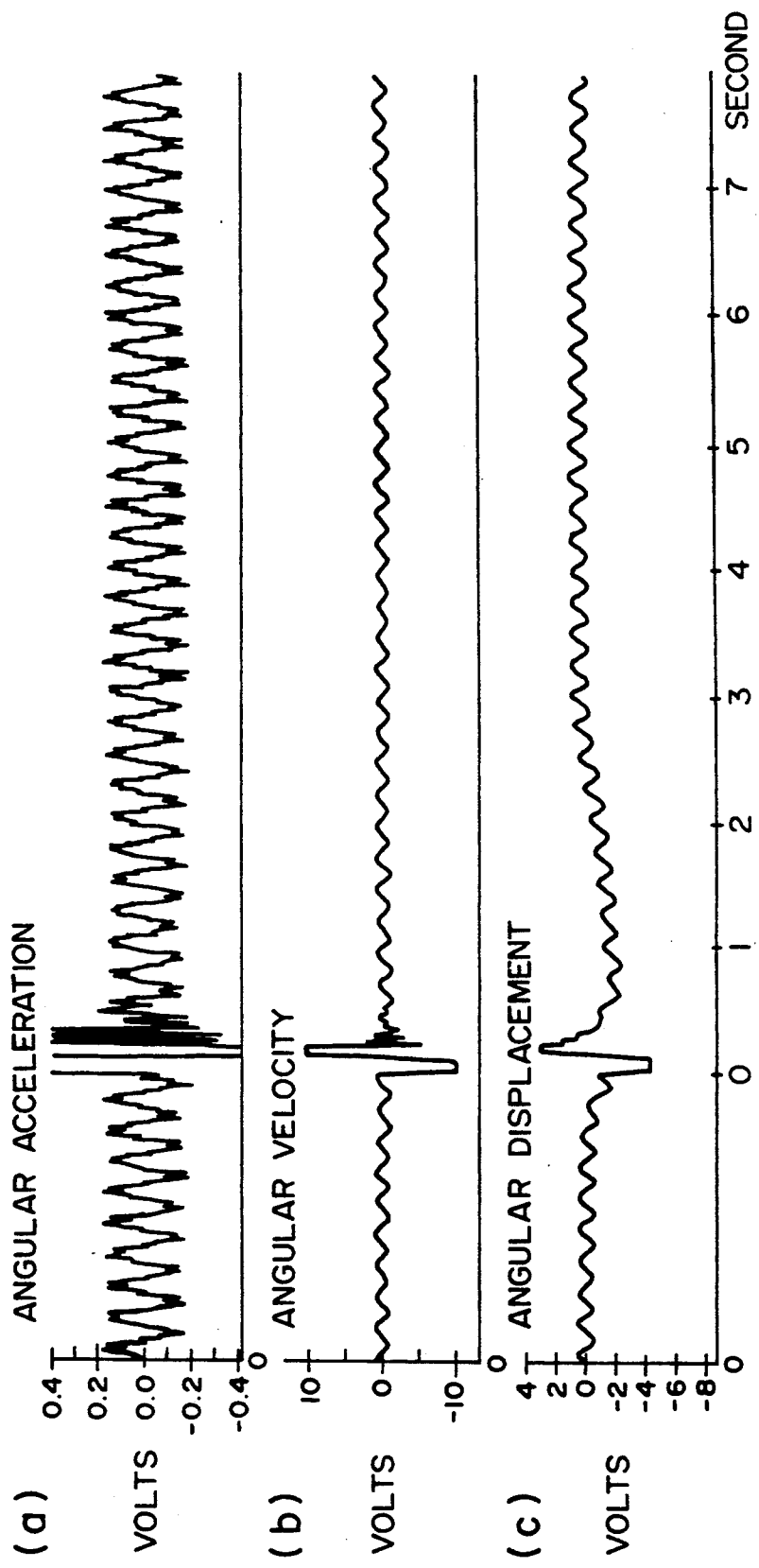
FIGS. 15(a), (b), and (c) are charts showing signal wave forms in different parts of the apparatus when a camera equipped with the apparatus shown in FIG. 1 or 8 is given a particular movement.

FIG. 15 shows the output of the high-pass filter 23 (angular acceleration), output of the integrator 25 (angular velocity) and output of the integrator 26 (angular displacement) when a camera equipped with the vibration detecting apparatus shown in FIG. 1 or 8 is swung, after being aimed at a first direction, to a second direction. This operation was conducted simulating the manual operation, by giving a vibration of a constant amplitude with a frequency in a range from 1 to 30 Hz of the manual shaking, and by swinging the camera to the second direction after being aimed at the first direction.

In FIG. 15, the wave forms before a time 0 are caused by the hand shaking while the camera is aimed at a first object in the first direction, and the vibrations in this period show regular forms representing the vibrations caused by hand shaking. Large changes in the wave form at the timing 0 are due to the influence of large acceleration caused by the swinging of the camera from the first direction to the second direction.

As will be apparent from FIG. 15, the vibration detecting apparatus of the present invention provides a regular wave form representing the angular displacement immediately after the camera is aimed at the second direction. In this manner the vibration detecting apparatus of the present invention is almost free from saturation of the integrators for example in the swinging motion of the camera. The vibration detecting apparatus of the present invention can therefore detect the vibration in rapid and exact manner even when the camera is swung, and is practical for loading in a camera.

As explained in the foregoing, the vibration detecting apparatus of the present invention, being provided with integrators of variable lower limit frequency of the integration range and control means for varying said lower limit frequency according to the input or output of said integrators, is capable of preventing a prolonged saturation of said integrators and thus exactly detecting the vibration promptly. The present invention can therefore provide a practical vibration detecting apparatus adapted for use for example in a camera.

In the following there will be explained still other embodiments of the present invention, with reference to FIGS. 16 to 27.

Figure 16:
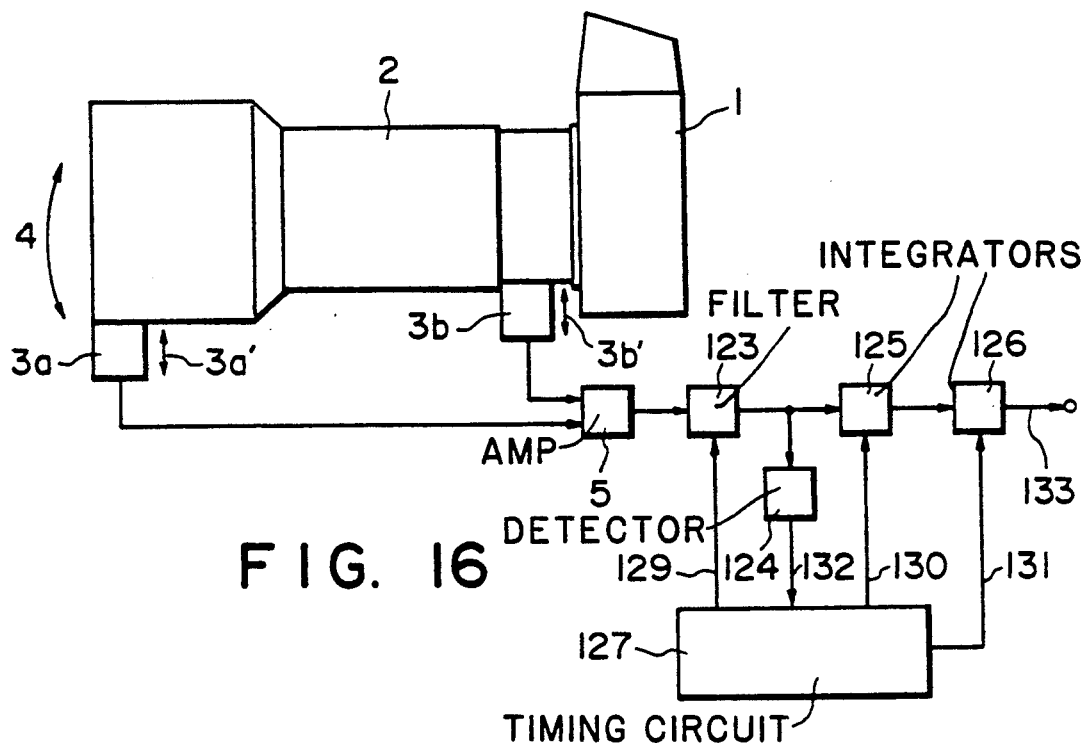
FIG. 16 is a block diagram of another embodiment of the vibration detecting apparatus of the present invention loaded in a camera.

FIG. 16 is a schematic view of another embodiment of the vibration detecting apparatus equipped on a camera, wherein same components as those in the aforementioned conventional apparatus shown in FIGS. 40 and 43 are represented by same numbers and will not be explained further.

In FIG. 16 there are shown a high-pass filter 123 capable of varying the cut-off frequency while maintaining a constant gain; an excessive acceleration signal detector 124 for detecting an excessively large acceleration; integrators 125, 126 with variable lower limit frequency of the integrable frequency range; and a timing circuit 127 constituting control means for generating control signals for varying the time constant of the high-pass filter 123 and the integrators 125, 126. Said variation of time constant is achieved by control signals supplied from the timing circuit 127 to the high-pass filter 123 and the integrators 125, 126 through signal lines 129 - 131.

Figures 17A, 17B:
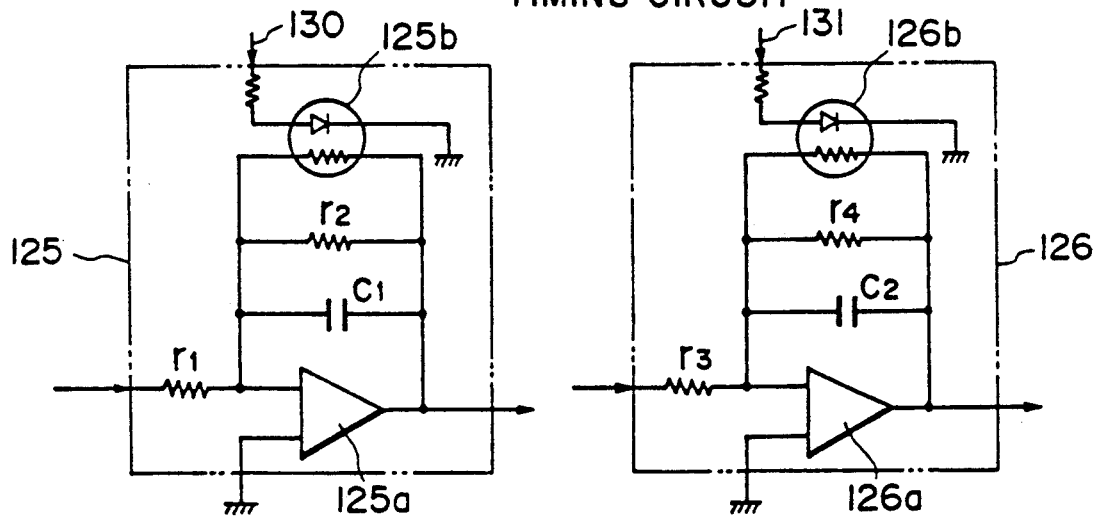
FIGS. 17A and 17B are circuit diagrams of examples of an integrator employed in the apparatus shown in FIG. 16.

FIGS. 17A and 17B show examples of the integrators 125, 126, wherein shown are operational amplifiers 125a, 126a; photocouplers 125b, 126b each composed of a photodiode (LED) and a CdS device; resistors $r_1$-$r_4$; and capacitors $C_1$, $C_2$.

Figure 18:
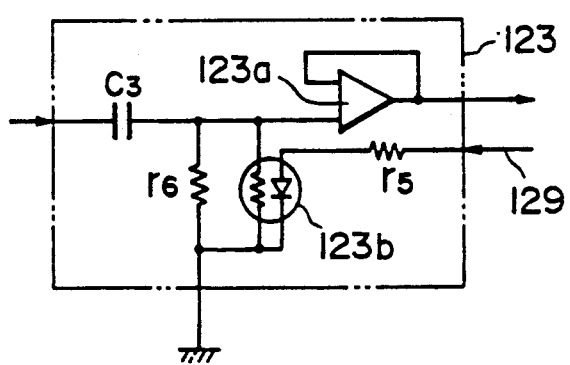
FIG. 18 is a circuit diagram of an example of a high-pass filter employed in the apparatus shown in FIG. 16.

FIG. 18 shows an example of the high-pass filter 123, wherein provided are an operational amplifier 123a; a photocoupler 123b of the same structure as explained above; resistors $r_5$, $r_6$; and a capacitor $C_3$.

The excessive acceleration signal detector 124 is composed of a known differential window comparator and sends a signal 132 to the timing circuit 127 when the output signal of the high-pass filter 123 is outside a predetermined range.

Figure 19A:
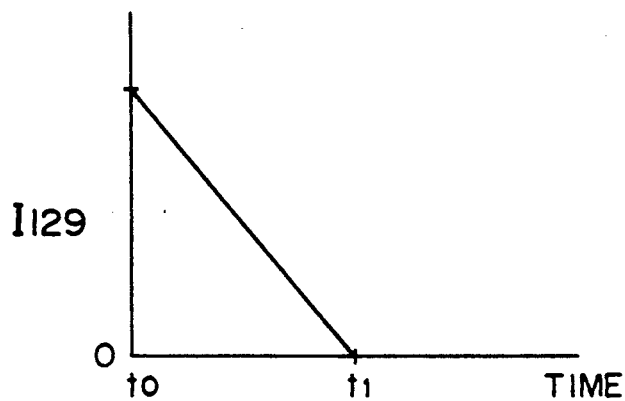
FIG. 19A is a chart showing a signal current from control means in the apparatus shown in FIG. 16 to the high-pass filter shown in FIG. 18.
Figure 19B:
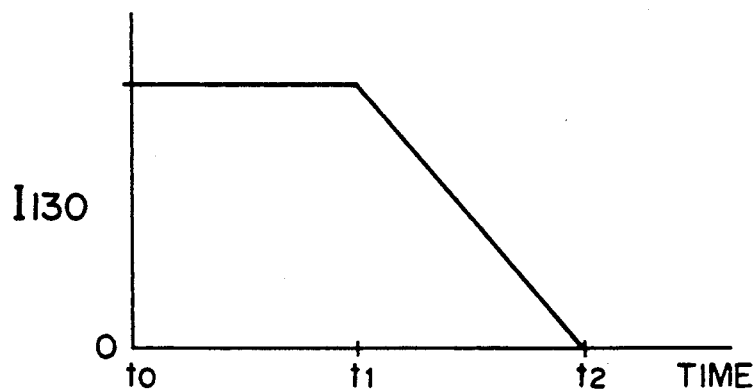
FIGS. 19B and 19C are charts showing signal currents from said control means to the integrator shown in FIG. 17.
Figure 19C:
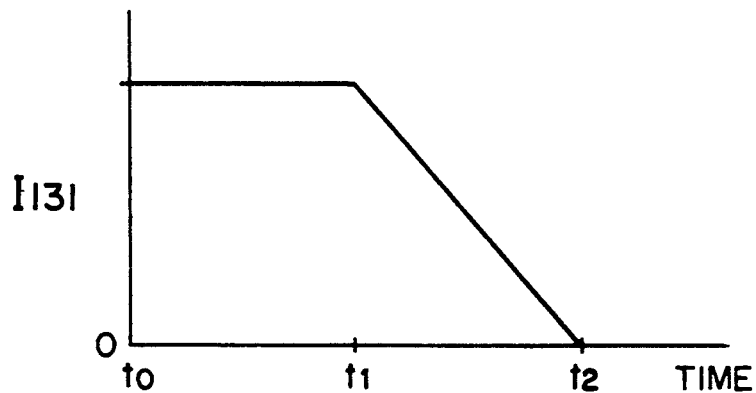

FIGS. 19A-19C show control signal (current signals) $I_{129}$-$I_{131}$ supplied from the timing circuit 127 to the high-pass filter 123 and the integrators 125, 126 at the start of power supply to the above-explained vibration detecting apparatus and at the entry of an excessive acceleration signal to the high-pass filter 123. FIGS. 19A-19C respectively show the control signals $I_{129}$ to the high-pass filter 123, $I_{130}$ to the integrator 125 and $I_{131}$ to the integrator 126, all from the timing circuit 127.

FIGS. 20A and 20B are Bode line charts of the gain of the integrators 125, 126. FIG. 20A illustrates the function characteristic of the integrators 125, 126 in a period from $t_0$ to $t_1$ in FIGS. 19A-19C, while FIG. 20B illustrates that after a time $t_2$.

The integrators 125, 126 are so constructed to vary the function characteristic continuously from a state shown in FIG. 20A to a state shown in FIG. 20B in a period from time $t_1$ to $t_2$ in response to the currents $I_{130}$ and $I_{131}$ supplied from the timing circuit 127 to the signal lines 130, 131, and to function according to FIG. 20A in a period from $t_0$ to $t_1$ and according to FIG. 20B after $t_2$.

In FIGS. 20A and 20B, the solid lines indicate the function characteristic of the integrators 125, 126 while the broken lines indicate the characteristic of an ideal integrator. The integrating operation of the integrators 125, 126 is conducted above the lower limit frequencies $f_1'$, $f_2'$ of the integration frequency range. In a period from time $t_1$ to $t_2$, the integrators 125, 126 of the present embodiment continuously vary the function characteristic from a state shown in FIG. 20A to a state shown in FIG. 20B, and the relationship between the gain and the frequency above the lower limit frequency (for example $f_1'$ in FIG. 20A) is always maintained same as that in FIG. 20B. More specifically, the integrators 125, 126 of the present embodiment of the function characteristic shown in FIGS. 20A and 20B have a low-cut ability in comparison with the ideal integrator, and are characterized by a fact that the lower limit frequency varies but the gain is not changed. In the present embodiment, the limit frequency (low-cut frequency) $f_b$ of the integrators 125, 126 at the time $t_2$ is selected at a value not exceeding 0.1 Hz in order to generate an exact signal matched in phase with the vibration of the camera.

Figure 21A:
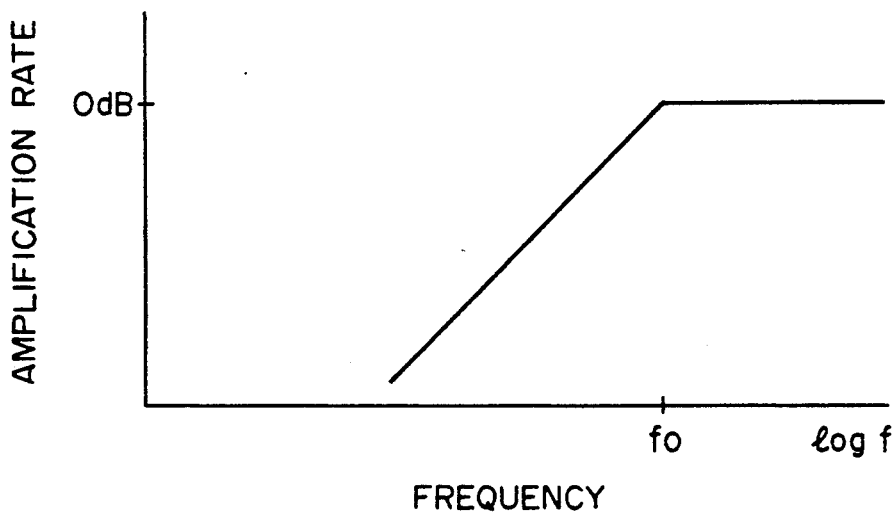
FIGS. 21A and 21B are charts showing the change in the function characteristic of said high-pass filter.
Figure 21B:
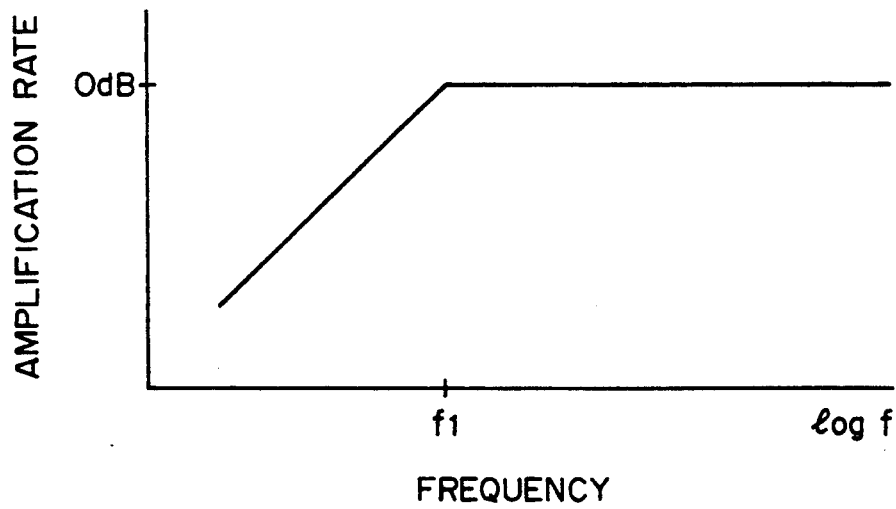

FIG. 21A is a characteristic chart of the high-pass filter 123 at time $t_0$, while FIG. 21B is a similar chart at time $t_1$ and thereafter. In a period from $t_0$ to $t_1$, the function characteristic of said high-pass filter 123 varies continuously from a state shown in FIG. 21A to a state in FIG. 21B, in a similar manner as the integrators 125, 126, according to the control signal $I_{129}$ supplied from the timing circuit 127.

Figure 22:
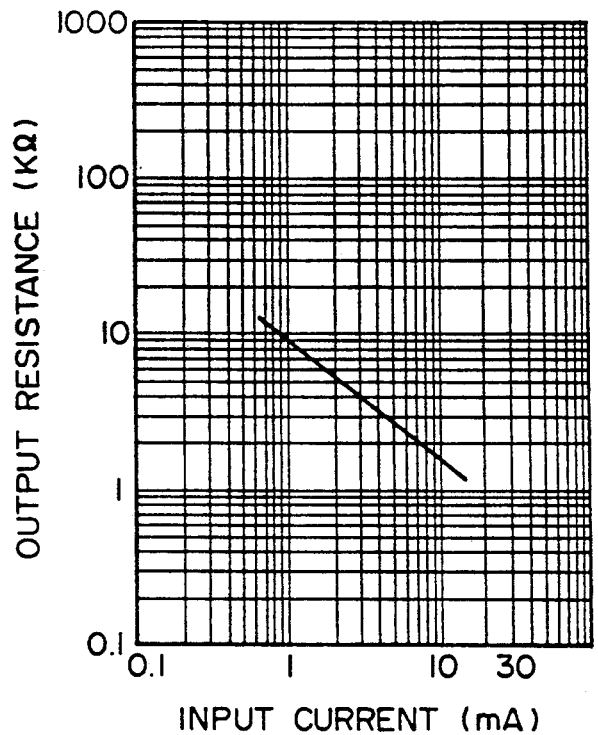
FIG. 22 is a chart showing the relationship between the output resistance and input current in a CdS element in a photocoupler equipped in the high-pass filter and integrator shown in FIGS. 17 and 18.

FIG. 22 shows the input-output characteristic of the photocouplers 123b, 125b, 126b respectively provided on the high-pass filter 123 and the integrators 125, 126.

Figure 23:
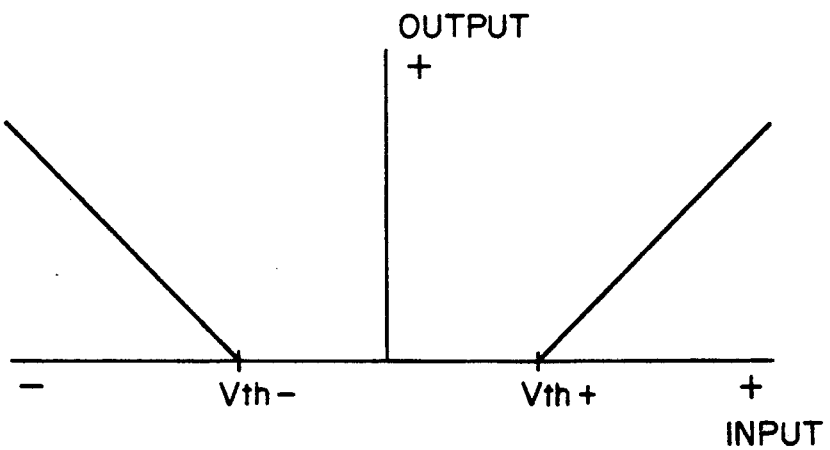
FIG. 23 is an input-output characteristic chart of a window comparator functioning as input signal discriminating means in the apparatus shown in FIG. 16.

FIG. 23 shows the input-output characteristic of the window comparator constituting the excessive acceleration signal detector 124.

In the following there will be explained the function of the vibration detecting apparatus of the present embodiment explained above.

When an unrepresented power switch is closed to connect an unrepresented power supply circuit to the vibration detecting apparatus thereby activating the acceleration meters 3a, 3b, an excessively large acceleration signals are generated from said acceleration meters 3a, 3b resulting from the start of power supply.

Such excessively large acceleration signals are also generated from the acceleration meters 3a, 3b after the start of power supply, when the camera is subjected to an excessive acceleration by some reason.

Said excessive acceleration signal is supplied to the high-pass filter 123, of which output is supplied to the accessive acceleration signal detector 124 composed of a window comparator. When the input voltage to said detector 124 is identified as outside a predetermined range from $V_{th-}$ to $V_{th+}$ shown in FIG. 23, an excessive acceleration detection signal 132 shown in FIG. 23 is supplied from said detector 124 to the timing circuit 127. Thus the timing circuit 127 is activated and sends the aforementioned control signals $I_{129}$-$I_{131}$ to the high-pass filter 123 and the integrators 125, 126, which are thus controlled in the following manner.

At the time $t_0$, the signal current $I_{129}$ shown in FIG. 19A starts to flow from the timing circuit 127, through the signal line 129, to the LED in the photocoupler 123b of the high-pass filter 123 shown in FIG. 18, and, at the same time the signal currents $I_{130}$, $I_{131}$ shown in FIGS. 19B and 19C start to flow, through the signal lines 130, 131, in the LED's in the photocouplers 125b, 126b of the integrators 125, 126 shown in FIG. 17.

At the time $t_0$, the high-pass filter 123 has a function characteristic shown in FIG. 21A with a cut-off frequency $f_c$ represented by $$f_c = \tfrac{1}{2}\pi C_H R_H$$

wherein $R_H$ is the synthesized resistance of the resistance of the CdS device in the photocoupler 123b and of that of the parallel resistor $r_s$, and $C_H$ is the capacitance of the capacitor $C_3$.

As shown in FIG. 22, the resistance of the CdS device decreases with the increase of the input current. In the above-mentioned equation, therefore, the value of $R_H$ increases from $t_0$ to $t_1$ (namely with the decrease of the signal current $I_{129}$ from $t_0$ toward $t_1$), whereby the cut-off frequency $f_c$ of the high-pass filter 123 decreases from the initial value $f_0$ at time $t_0$ shown in FIG. 21A toward the value $f_1(<f_0)$ shown in FIG. 21B at time $t_1$.

The time $\tau$ required for the stabilization of the high-pass filter 123 is inversely proportional to the cut-off frequency $f_c$. Said time $\tau$ therefore becomes shorter at a point closer to $t_0$ or the timing of start of power supply, and the frequency range capable of providing exact output becomes narrower at a timing closer to $t_0$. Thus the high-pass filter 123 stabilizes faster more immediately after the start of power supply, and shows a wider frequency range of exact function as it becomes closer to $t_1$, whereby the cut-off frequency reaches $f_1$ at $t_1$.

On the other hand the signal currents $I_{130}$, $I_{131}$ shown in FIGS. 19B and 19C are supplied from the timing circuit 127 to the CdS devices of the photo couplers 125b, 126b of the integrators 125, 126 from the time $t_0$, and, in a period from $t_0$ to $t_1$, the integrators 125, 126 execute integration above a relatively high frequency $f_1'$ as shown in FIG. 20A since said signal currents assume a constant high value. The lower limit frequency $f'$ of the integrable range of the integrators 125 (,126) is represented by:

$$f' = \tfrac{1}{2}\pi C_i R_i$$

wherein $R_i$ is the synthesized resistance of the photocouplers 125b (,126b) and the resistors $r_2$, ($r_4$,) while $C_i$ is the capacitance of the capacitor $C_1$ ($C_2$,) and the stabilizing time $\tau$ of the integrator 125 is inversely proportional to $f'$. The integrator 125 executes integration in a frequency range above $f'$ but merely functions as an inverting amplifier in a range below $f'$.

In the conventional vibration detecting apparatus, said $f'$ is selected low so that the gain for DC component is high. Consequently the integrators may be saturated and become incapable of integration when the high-pass filter is not yet stabilized and shows a DC component in the output.

In the vibration detecting apparatus of the present embodiment, the lower limit frequency $f'$ of the integrating range of the integrators 125, 126 is maintained relatively high by the timing circuit 127 until the high-pass filter 123 is stabilized at $t_1$, thereby expediting the stabilization of the integrators 125 and 126 and detecting vibration from the high frequency components. Thereafter the value of $f'$ is reduced in a period from $t_1$ to $t_2$ to gradually widen the integrating range, and exact detection of vibration is conducted from low frequency components at the time $t_2$.

The lower limit frequency $f_2'$ of the integrators 125, 126 and the cut-off frequency $f_1$ of the high-pass filter 123 can be selected suitably depending on the frequency to be detected. In the present embodiment, $f_2'$ is selected equal to or lower than 0.1 Hz, and $f_0$ and $f_1'$ are selected equal to or higher than 0.5 Hz.

The acceleration signals generated from the acceleration meters 3a, 3b are subjected to subtraction in the differential amplifier 5, which sends an angular acceleration signal corresponding to the difference of outputs of the acceleration meters, to the high-pass filter 123. A DC offset error contained in said angular acceleration signal is eliminated by said high-pass filter 123. Said filter reduces the cutoff frequency with the lapse of time according to the signal current $I_{129}$, shown in FIG. 19A, from the timing circuit 127, and continuously varies the function characteristic from a state shown in FIG. 21A to a state shown in FIG. 21B within a period from $t_0$ to $t_1$. Consequently, during said period, the angular acceleration signal supplied to the high-pass filter 123 is cut to the components of higher frequency at an earlier timing, so that the lower limit frequency of the output of the high-pass filter becomes higher at an earlier timing. More specifically the high-pass filter 123 only transmits the relatively high frequency components of the input signal at a timing close to the time $t_0$ of start of power supply, but transmits also the lower frequency components at a timing closer to $t_1$.

After the elimination of the offset error etc. in the high-pass filter, the angular acceleration signal is supplied in succession to the integrators 125, 126 to obtain the displacement signal 133 from the integrator 126.

The lower limit frequencies of the integrating ranges of the integrators 125, 126, being controlled by the signal currents $I_{130}$, $I_{131}$ from the timing circuit 127 is equal to a value $f_1'$ shown in FIG. 20A in the period from $t_0$ to $t_1$, and varies to $f_2'$ shown in FIG. 20B in the period from $t_1$ to $t_2$.

Figure 24:
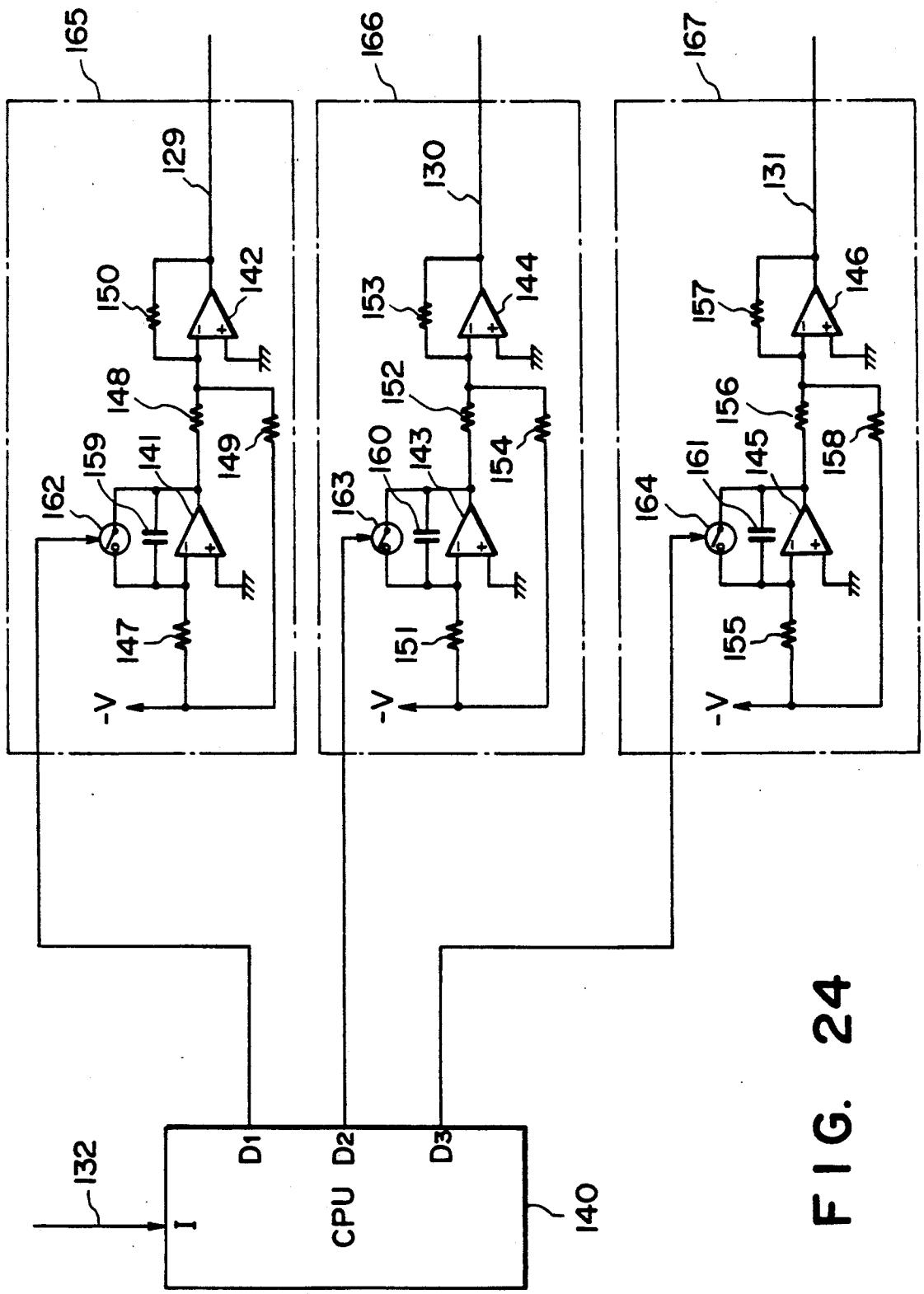
FIG. 24 is a circuit diagram showing an example of a timing circuit shown in FIG. 16.

FIG. 24 shows an example of the timing circuit 127 shown in FIG. 16.

In FIG. 24 there are shown a microcomputer (CPU) 140; operational amplifiers 141-146; resistors 147-158; capacitors 159-161; and analog switches 163-164.

Figure 25:
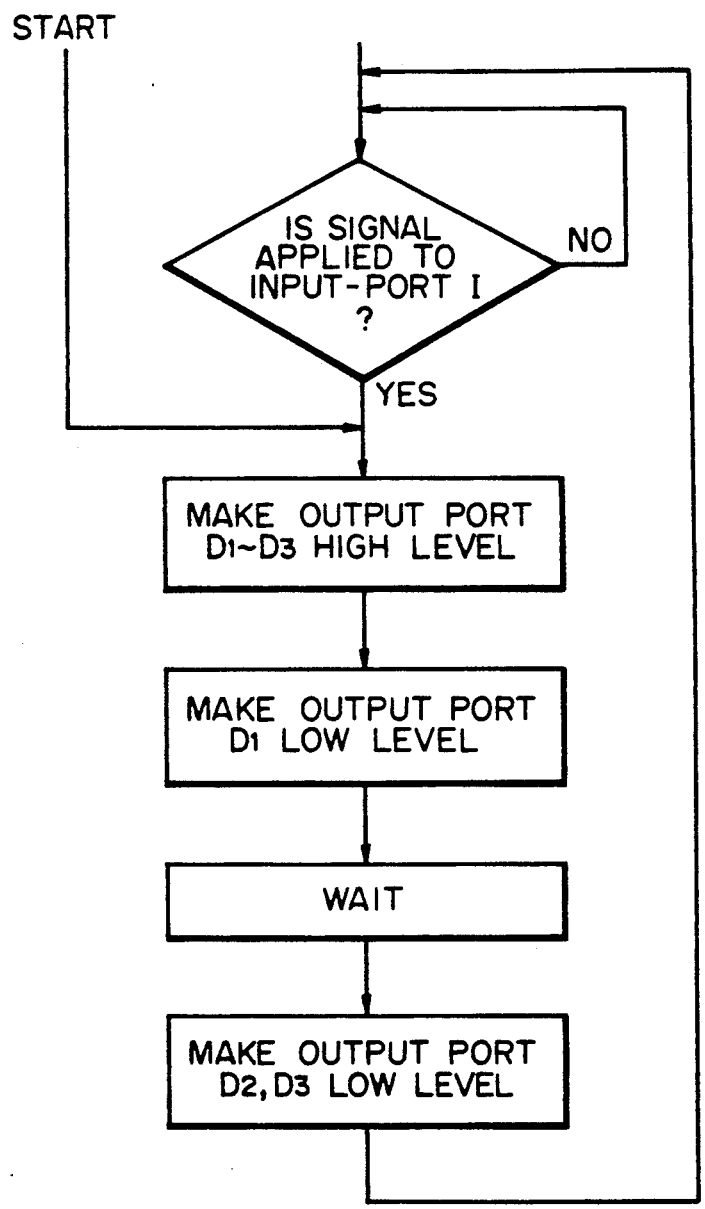
FIG. 25 is a flow chart showing the function of a microcomputer shown in FIG. 24.

The CPU 140 is provided with input/output ports $D_1$-$D_3$ and is controlled according to a flow chart shown in FIG. 25. In the following there will be only explained a block 165, since blocks 165, 166 and 167 are constructed in similar manner.

The operational amplifier 141 constitutes an integrator in combination with the capacitor 159 and the resistor 147. The analog switch 162 is turned on to discharge the capacitor 159 when the signal $D_1$ from the CPU 140 is at the high level. Thus, in the off-state of the analog switch 162, the output of the operational amplifier 141 changes as shown in FIG. 26(a) from the time 0 of discharge of the capacitor 159, and said output is added with a voltage $-V$ and inverted by an inverting adder composed of the operational amplifier 142 and the resistors 148-150 to provide an output as shown in FIG. 26(b). $+V$ and $-V$ are power supply voltages of the operational amplifiers. A time $t_1$ is determined by the values of the resistor 147 and the capacitor 159.

Figure 26:
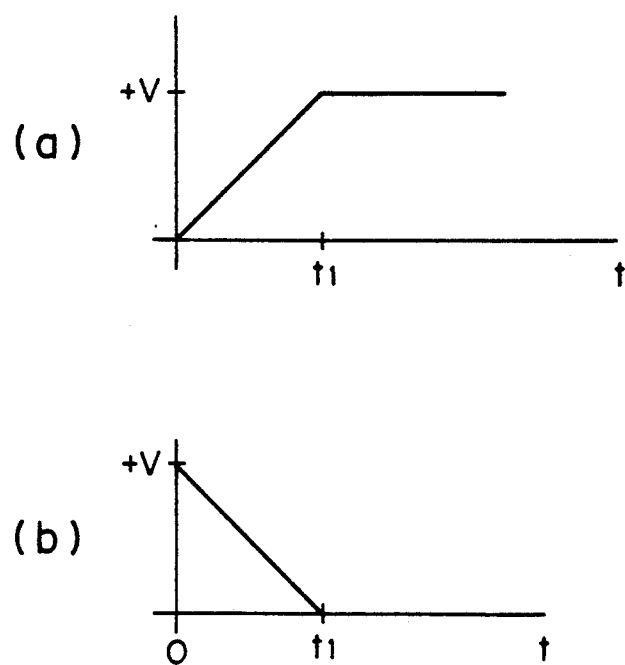
FIG. 26 is a chart showing output states of an operational amplifier shown in FIG. 24.
Figure 27:
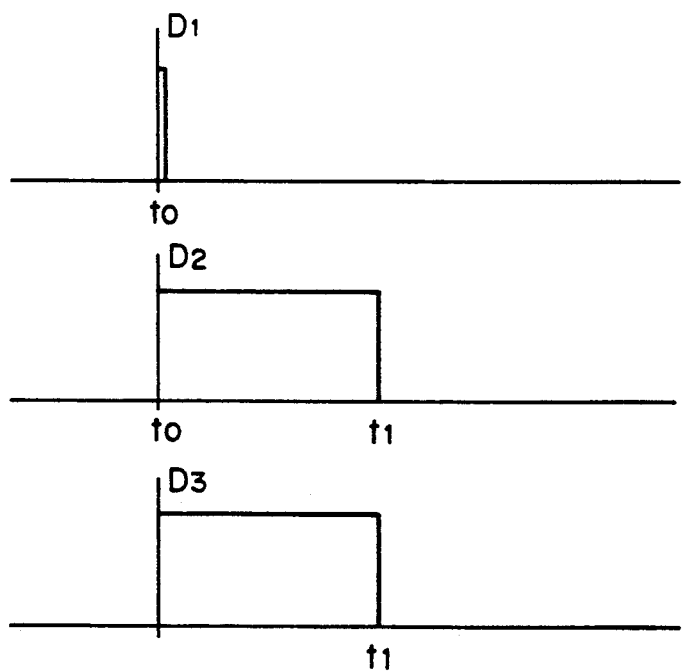
FIG. 27 is charts showing output states of the microcomputer shown in FIG. 24.

The CPU 140, functioning according to the flow chart shown in FIG. 26, shifts the output ports $D_1$-$D_3$ to the high level at the start of power supply, then shifts the output port $D_1$ to the low level, and executes a waiting step until the time $t_1$. Thereafter the output ports $D_2$, $D_3$ are shifted to the low level. In this manner the CPU 140 releases output signals shown in FIG. 27 wherein $t_0$ indicates the timing of start of power supply. Upon completion of a sequence at the start of power supply, the CPU 140 checkes the input port I, and, in the presence of an input, executes a procedure same as that at the start of power supply, starting from the time $t_0$ of said input. Thus, at the signal input from the excessive acceleration detector 124 shown in FIG. 16 and at the start of power supply, there is conducted the procedure of releasing the signals shown in FIG. 19 to the signal lines 129-131 shown in FIG. 16, taking the timing of said signal input or start of power supply at the time $t_0$.

Figure 28A:
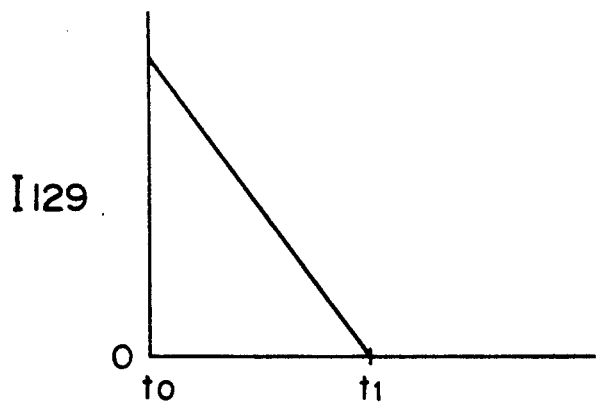
FIGS. 28A, 28B and 28C are charts showing examples of signal currents different from those in FIG. 19.
Figure 28B:
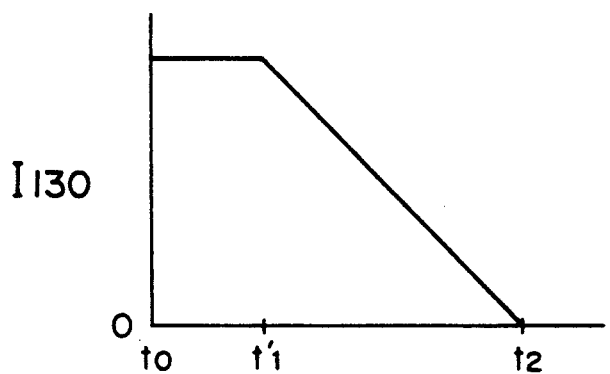
Figure 28C:
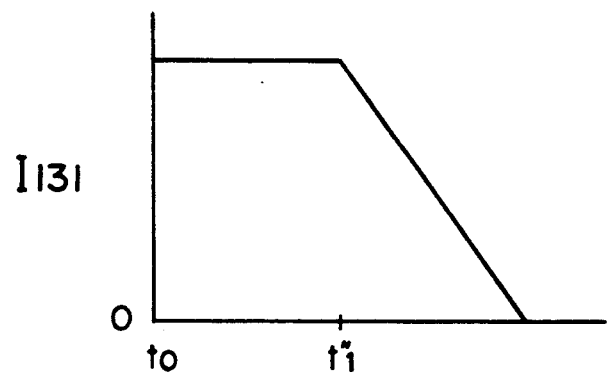

FIG. 28 shows another embodiment in which the control signals supplied from the timing circuit 127 to the high-pass filter 123 and the integrators 125, 126 are different from those shown in FIG. 19.

In this embodiment, the signal current $I_{129}$ supplied to the high-pass filter 123 is same as that shown in FIG. 19, but the signal currents $I_{130}'$ and $I_{131}'$ supplied to the integrators 125, 126 are different from those shown in FIGS. 19B and 19C. More specifically, the signals $I_{130}'$, $I_{131}'$ respectively supplied to the integrators 125, 126 start to decrease at times $t_1'$ and $t_1''$ before the signal $I_{129}$ to the high-pass filter 123 reaches zero, so that, in the present embodiment, the lower limit frequencies of the function of the integrators 125, 126 vary from a high frequency to a low frequency while the cut-off frequency of the high-pass filter 123 varies from a high frequency to a low frequency.

Figure 29:
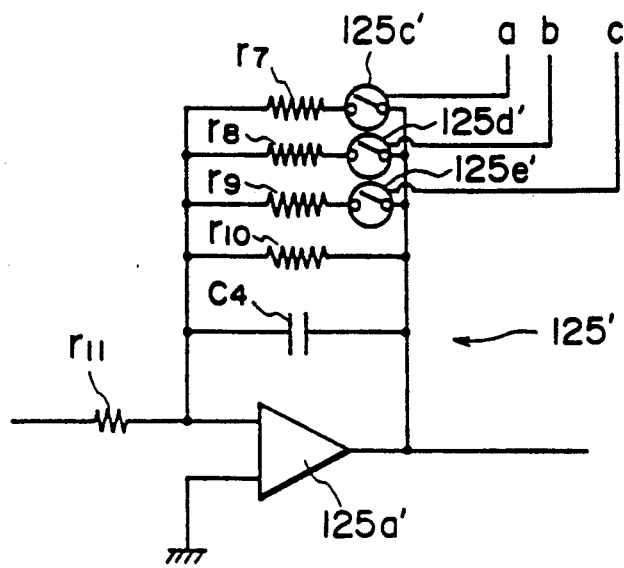
FIG. 29 is a circuit diagram showing an example of the integrator different from that shown in FIG. 17.
Figure 30:
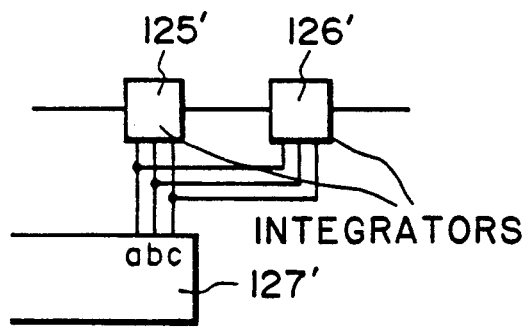
FIG. 30 is a schematic block diagram of a part of the vibration detecting apparatus employing the integrator shown in FIG. 29.

FIGS. 29 and 30 illustrate an embodiment of the structure of the integrators and the timing circuit when the apparatus shown in FIG. 16 is constructed in digital system, wherein FIG. 29 shows an example of the structure of the integrators while FIG. 30 shows the connection of a timing circuit 127' with the integrators 125', 126' shown in FIG. 29 for controlling said integrators.

FIG. 29 shows the structure of an integrator 125', in which there are provided an operational amplifier 125a'; resistors $r_7$-$r_{10}$ connected parallel to said operational amplifier 125a'; a capacitor $C_4$ connected parallel to the operational amplifier 125a'; analog switches 125c', 125d' and 125e'; and a resistor $r_{11}$. Another integrator 126' is omitted since it is of same structure.

The analog switches 125c', 125d', 125e' are selectively turned on by signals a-c from a timing circuit 127' of a known structure to connect the resistors $r_7$-$r_9$ parallel to the operational amplifier 125a', thereby varying the time constant of the integrator 125'.

Figure 31:
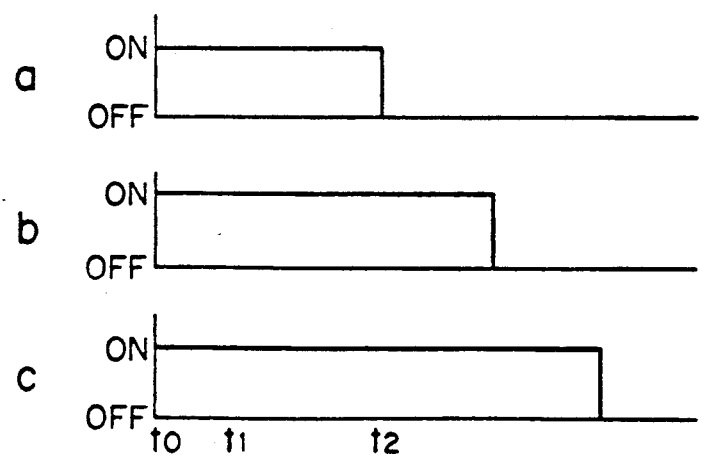
FIG. 31 is a timing chart showing control signals supplied from control means to the integrator shown in FIG. 29 in the structure shown in FIGS. 29 and 30.

FIG. 31 is a chart showing the timing of the control signals a-c supplied from the timing circuit 127' to said analog switches of the integrators 125', 126'. The control signal a turns on the analog switch 125c' for a period from $t_0$ to $t_2$, while the control signals b, c respectively turn on the analog switches 125d', 125e' for longer periods. Consequently, in said period from $t_0$ to $t_2$, the bypass resistors $r_7$-$r_9$ are connected, together with the resistor $r_{10}$, parallel to the capacitor $C_4$ to elevate the lower limit function frequency of the integrator 125'. After the time $t_2$, said lower limit frequency becomes lower stepwise.

Also in the present embodiment, there is employed a high-pass filter of the structure shown in FIG. 18. At the start of power supply and in the presence of an excessive acceleration, the timing circuit 127' supplies, as in the foregoing embodiment, the high-pass filter 123 with a control current signal as shown in FIG. 19A and tho integrators 125', 126' with the control signals as shown in FIG. 31, whereby a function same as that of the embodiment shown in FIG. 16 is achieved by said high-pass filter and the integrators 125', 126'.

The embodiment shown in FIGS. 29 and 30 shows improved reliability due to the absence of components showing changes in performance over a prolonged period, such as CdS devices, in the bypass circuit of the operational amplifier. Also it requires a smaller circuit area in comparison with the embodiment employing CdS photocouplers.

In the circuit shown in FIG. 29, the resistors $r_7$-$r_{10}$ may be replaced by MOSFET which will further compactize the circuit and reduce the power consumption.

In the above-explained embodiment, the excessive acceleration signal detector 124 for discriminating the level of the input signal is provided at the input end of the integrator 125, but the means for discriminating the input signal level (namely for detecting excessive acceleration) may naturally be provided at an arbitrary position in any form.

The excessive acceleration signal detector 124 detects the output signal of the high pass filter 123, but it may detect the input signal of the high-pass filter 124.

As explained in the foregoing, the vibration detecting apparatus of the present embodiment, being provided with a high-pass filter with variable cut-off frequency; integrators with variable lower limit frequency of the integrable range; input signal discrimination means for identifying that the input signal to said integrator is outside a predetermined range; and control means for varying the cut-off frequency of said high-pass filter and said lower limit frequency of said integrators to a low value from a high value in response to the identification by said input signal discriminating means that the input signal is outside said predetermined range, is capable of very rapid stabilization of said high-pass filter and said integrators at the start of power supply or in the presence of an excessively large acceleration, and is further capable of exact detection of vibration even before such stabilization.

In the following there will be explained still another embodiment of the present invention.

Figure 32:
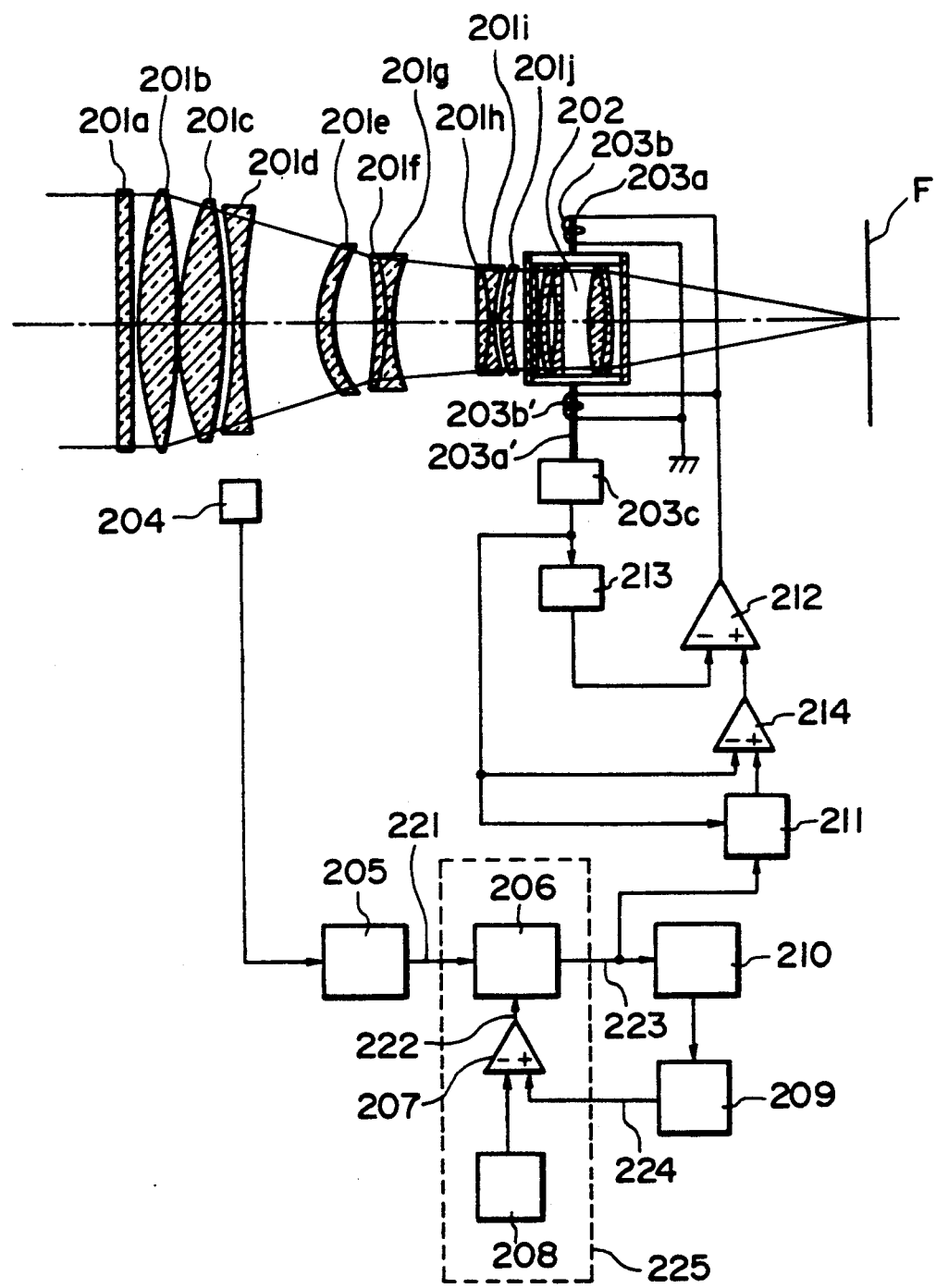
FIG. 32 is a schematic view of a vibration preventing apparatus for a camera, employing a vibration detecting apparatus constituting another embodiment of the present invention.

FIG. 32 illustrates an example of vibration preventing apparatus for a camera, employing the vibration detecting apparatus of the above-explained embodiment, wherein lenses 201a-201j integrally constitute an afocal lens system. Also there is provided a lens group constituting a correction optical system for moving the image on an image plane F by converging a parallel light beam and radially shifting said light beam. In the present example, the ratio of the amount of shift by said correction optical system 202 to the amount of shift of the image on the image plane is selected as 1:1.

An actuator 203 linked to the correction optical system 202 is composed of movable magnets 203a, 203a', coils 203b, 203b' and a position sensor 203c for detecting the lens position. The lens group constituting the correction optical system is supported, when not energized, at the radially central position by unrepresented plate springs.

An angular acceleration sensor 204 provided in the tube of the lens 202 detects the angular velocity of rotaty motion of the lens in the plane of drawing. A high-pass filter 205 is provided for eliminating the DC offset component from the output signal of the angular acceleration sensor 204.

The output signal of said high-pass filter 205 is supplied, through a signal line 221, to an integrator 206 with variable time constant, constituting the principal feature of the present embodiment, for conversion into an angular velocity signal which is released through a signal line 223. Said output signal of the integrator 206 is supplied to a drive control circuit of the correction optical system, and also to a time constant varying circuit composed of an integrator 210, an absolute value circuit 209, a comparator 207 and a triangular wave oscillator 208 for varying the time constant of said integrator 208. In the present embodiment, the time constant varying circuit is composed of switch drive means for generating a high frequency pulse signal for turning on and off a switch 220 provided in the integrator 206 as will be explained later, and pulse width modulating means for varying the duty ratio of said pulse signal.

Said time constant varying circuit of the present embodiment integrates the angular velocity signal from the integrator 206 by means of the integrator 210 into an angular displacement signal, then causes the absolute value circuit 209 of known structure to release an output signal corresponding to the absolute value of said angular displacement signal, compares the output signal of said absolute value circuit 209 with that of the triangular wave oscillator 208 in the comparator 207 and sends thus obtained pulse signal of a predetermined duty ratio of said integrator 206 through a signal line 222 thereby obtaining the on/off signal for the switch 220 for varying the time constant thereof. The oscillating frequency of said triangular wave oscillator 208 is preferably selected sufficiently higher than the frequency range in which the integrator 206 executes integration.

The drive control circuit for the correction optical system of the present embodiment is constructed in the following manner.

Figure 34:
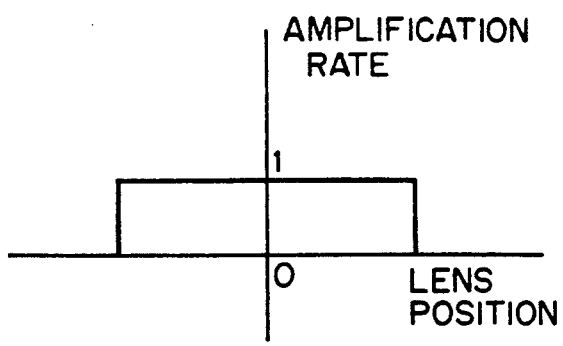
FIG. 34 is an amplification characteristic chart of a correction signal supplied to an actuator of a correction optical system for preventing image vibration in the apparatus shown in FIG. 32.

A position filter 211 receiving the signal from the integrator 206 also receives the signal from the aforementioned position sensor 203c for detecting the radial position of the correction optical system 202, and transmits the angular velocity signal from the integrator 206 to the actuator only when the correction optical system 202 is radially movable, thus capable of a movement for correction. Therefore said position filter 211 has a gain which, as shown in FIG. 34, is equal to 1 when the correction optical system is inside the radial limit positions, and 0 when said system is at one of said limit positions.

A differential amplifier 212 constituting a feedback loop for moving the correction optical system 202 under speed control and a differentiator 213 for converting the position signal of the correction optical system detected by said position sensor 203c into a velocity signal control the movement of the correction optical system under servo speed control in cooperation with movable magnets 203a, 203a', coils 203b, 203b' and position sensor 203c.

A differential amplifier 214 provides weak position feedback by releasing a weak negative velocity signal to the correction optical system 202 for bringing said optical system to the radially central position.

Figure 33:
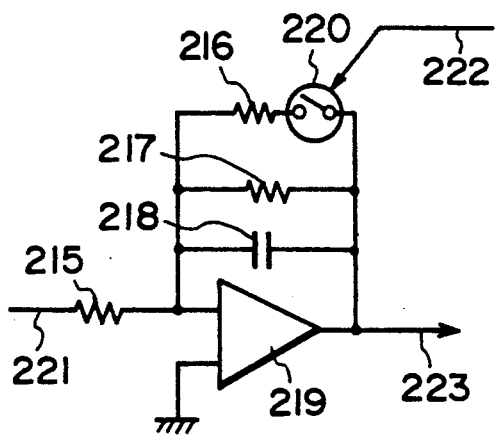
FIG. 33 is a circuit diagram of an integrator employed in the apparatus shown in FIG. 32.

FIG. 33 shows an example of said integrator 206, wherein provided are resistors 215, 216, 217; a capacitor 218; and an operational amplifier 219. An analog switch 220, constituting the principal feature of the present embodiment, is connected to the aforementioned comparator 207 and is turned on and off by the signal from the signal line 222.

The foregoing explanation relates to a system for preventing the vibration in the vertical direction, in the drawing, of a camera having the lens system shown in FIG. 32, but it is to be understood that a similar system is provided in a direction perpendicular to the plane of drawing.

In the following there will be explained the function of the vibration preventing apparatus explained above.

Let us consider a situation where the above-explained circuits are energized for ordinary photographing operation and the camera is aimed at a stopped object. In general the camera is subjected to small motions of acceleration by hand shaking, around a certain direction. In such case the angle between the direction of target and the central axis of the lens varies according to the hand shaking. However, the angular velocity and the angular acceleration caused by hand shaking are zero in average.

The angular acceleration signal detected by the angular acceleration sensor 204 is subjected to the removal of the offset component etc. by the high-pass sensor 205, and is converted by the integrator 206 into an angular velocity signal, which is used in the actuator to vibrate the correction optical system 20 for preventing the vibration of image.

In such ordinary operation the analog switch 210 of the integrator 206 is turned off, as will be explained in more detail.

The foregoing explanation applies to the function of the image vibration preventing apparatus in the ordinary photographing operation. In the following there will be explained a case of swinging the camera from such ordinary photographing state, in which the camera is aimed at the first stationary object, to a state in which the camera is aimed at a second stationary object.

In the present embodiment, the function of the integrator with variable time constant is effectively exploited in such case as will be explained in the following.

The angular velocity signal from said integrator 206 is converted, in the integrator 210 constituting the time constant varying circuit, into an angular displacement signal, which is supplied to the absolute value circuit 209 for generating an absolute value signal of a predetermined level proportional to the value of the entered angular displacement signal.

In the time constant varying circuit of the present embodiment, the comparator 207 compares said absolute value signal with the signal from the triangular wave oscillator 208 to generate pulses of a duty ratio determined according to the magnitude of the absolute value signal from said absolute value circuit 209. Said pulses are supplied through the signal line 222 to the analog switch 220 of the integrator 206 for on/off control of said analog switch 220.

FIG. 37 shows the relationship between the output of the comparator 207 and the output of the absolute value circuit 209, in the time constant varying circuit of the present embodiment.

Figure 37A:
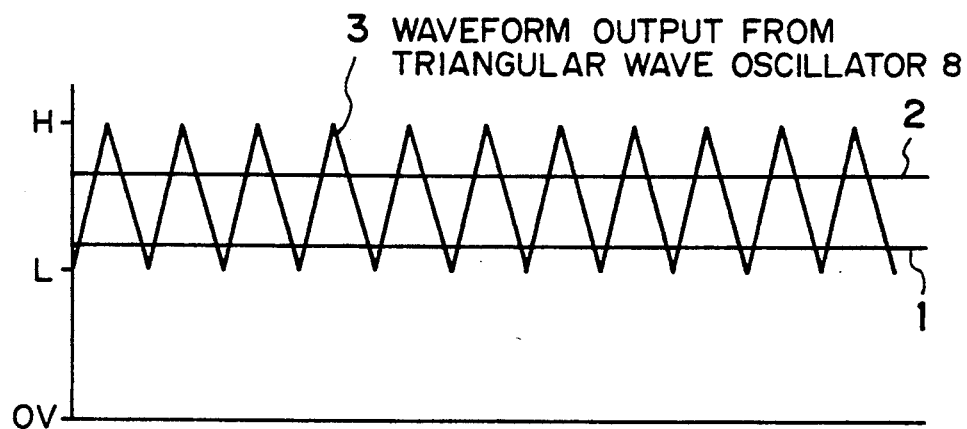
FIG. 37A is a chart showing input signals to a comparator in the apparatus shown in FIG. 32.
Figure 37B:
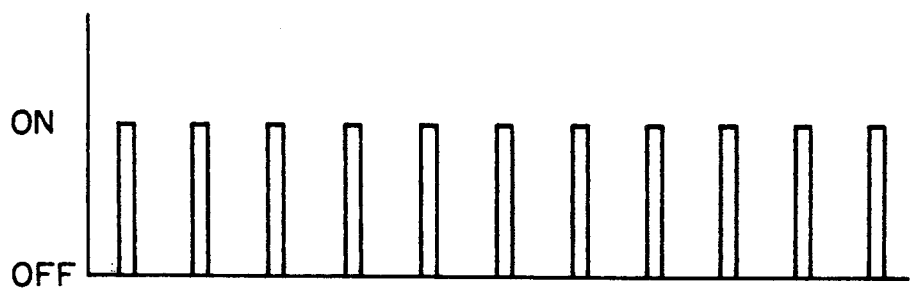
FIGS. 37B and 37C are charts showing pulse-width modulated signals from a comparator in the apparatus shown in FIG. 32.
Figure 37C:
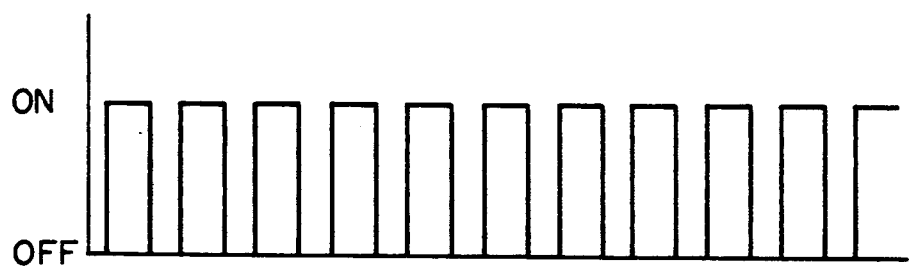

Let us consider a case that the output of the triangular wave oscillator 208 has a wave form (3) shown in FIG. 37A and that the output of the absolute value circuit 209 supplied through the signal line 224 has a value (1) or (2) between the maximum value H and minimum value L of said output. In the case (1) where the output of the absolute value circuit 209 is relatively small, the output of the comparator 207 is respectively turned on or off when the output of the absolute value circuit 209 is larger or smaller than the triangular wave, thus assuming a wave form shown in FIG. 37B. On the other hand, in the case (2) where the output of the absolute value circuit 209 is relatively large, the output of the comparator 207 assumes a wave form shown in FIG. 37C. Thus the duty ratio of the pulse signal from the comparator 207 is determined by the slicing level of the triangular wave from the triangular wave generator 208 by the output signal of the absolute value circuit 209. Said duty ratio can vary continuously from 0 to 100%, depending on the magnitude of the output signal of the absolute value circuit between the maximum value H and the minimum value L of said triangular wave.

The analog switch 220 of the integrator 208 is turned on and off by said pulse signal with variable duty ratio.

Figure 35:
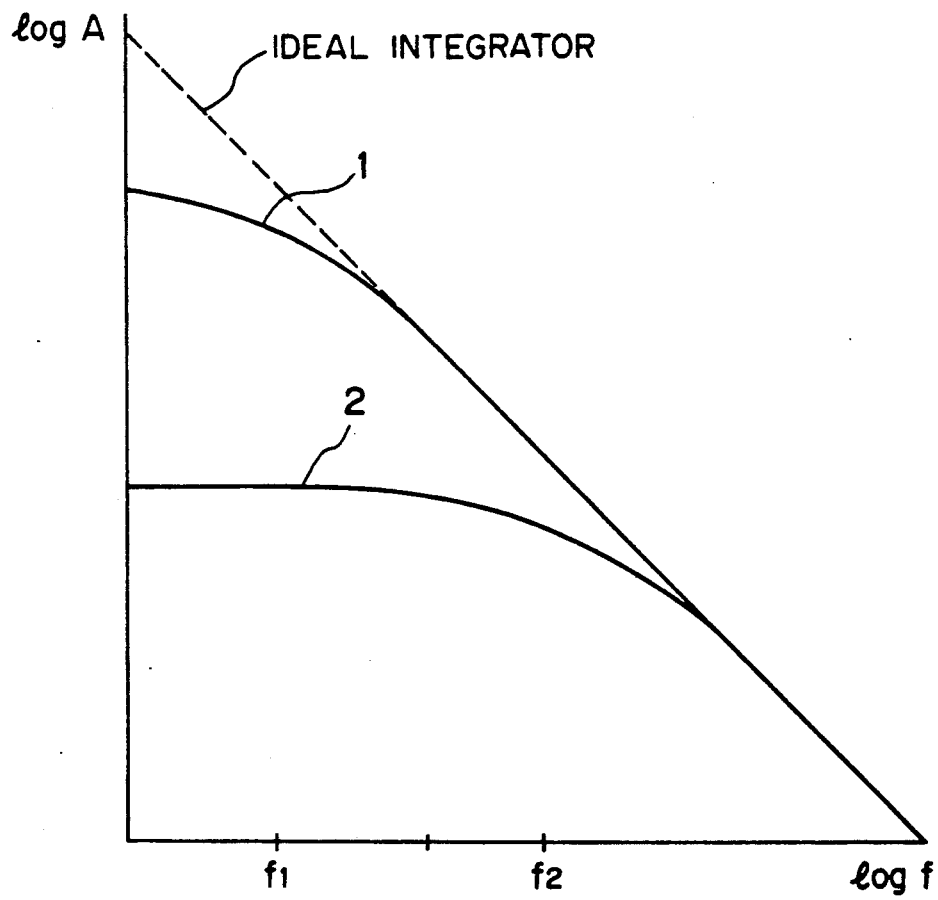
FIG. 35 is a characteristic chart of a cut-off frequency of the integrator shown in FIG. 33.

In the following there will be explained cases where the output of the absolute value circuit 209 is lower than the minimum L or higher than the maximum H. In the former case in which the output is lower than the minimum L, the output of the comparator 207 is always off as will be apparent from FIG. 37 so that the analog switch 220 is continuously turned off. In this state the integrator 206 has a frequency-dependent gain A shown by a curve (1) in FIG. 35, and the cut-off frequency $f_1$ in this state is given by:

$$f_1 = \frac{1}{2\pi \cdot C_{217} \cdot R_{218}}$$

The integrating operation is conducted on the input signal in a frequency range higher than said cut-off frequency $f_1$.

On the other hand, in the latter case where the output is higher than the maximum H, the output of the comparator 207 is always on as will be apparent from FIG. 37, so that the analog switch 220 is continuously turned on. In this state the gain A of the integrator 206 assumes the form of a curve (2) in FIG. 35, and the cut-off frequency $f_2$ is given by:

$$f_2 = \frac{1}{2\pi \frac{R_{216} \cdot R_{217}}{R_{216} + R_{217}} \cdot C_{218}}$$

The integrating operation is conducted on the input signal in a frequency range higher than said cut-off frequency $f_2$.

Figure 38:
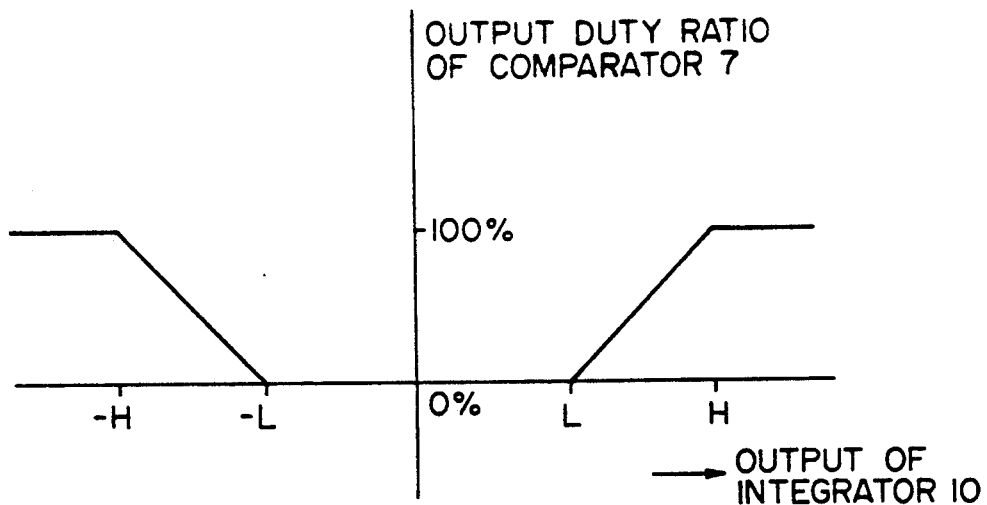
FIG. 38 is a chart showing the relationship between the output of an absolute value circuit and the duty ratio of pulse signal in the apparatus shown in FIG. 32.

In the interim case, the time constant of the integrator varies substantially continuously, according to the relationship between the output of the absolute value circuit 209 and the duty ratio of the pulse signal as shown in FIG. 38. FIG. 36 shows the cut-off frequencies at different duty ratios of 0:20, 1:19, 2:18, 4:16, 10:10, 19:1 and 20:0 and it will be understood that the cut-off frequency changes substantially continuously between the states (1) and (2) in FIG. 35.

In the vibration detecting apparatus of the present embodiment having integrators of which the time constant is variable by the duty ratio of the pulse signal, if the time-averaged output of said integrator 206 becomes large for example due to saturation thereof, the integrator 210 also provides an increased output and a pulse signal of a duty ratio selected by the characteristics of the absolute value circuit 209 and the comparator 207 is supplied to said integrator 206 for on/off control of the analog switch 220, whereby said integrator shows a reduced time constant and an increased cut-off frequency. Thus, in an ordinary photographing operation aiming at a point, the integrator 206 rapidly recovers from an abnormal state with a large time-averaged output to a normal state where said averaged value is almost zero. Then, with the decrease of the output of the absolute value circuit 209 connected to the integrator 210, the function characteristic thereof moves from a state (2) to (1) shown in FIG. 36, thus smoothly moving the normal state.

In addition, since the control for varying the output characteristic of the integrators is achieved by a variation in the duty ratio of the pulse signal determining the on/off states of the integrator 220, depending on the output from the absolute value circuit, it is rendered possible to employ integrated circuits in the pulse generator etc., to provide compact circuit structure suitable for mass production and to ensure stability of the circuit components over a prolonged period.

The present invention is naturally not limited to the foregoing embodiments. For example the circuit for generating the pulse signal for on/off control of the analog switch of the integrators is not limited to the triangular wave oscillator explained above, and various modes of variation of the time constant are possible by employing various wave forms in said oscillator.

Figure 39A:
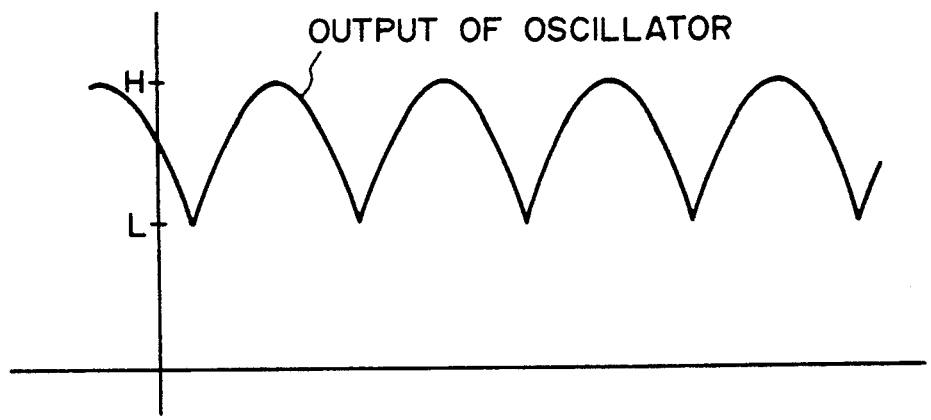
FIG. 39A is a waveform chart showing the output wave form of another oscillator.
Figure 39B:
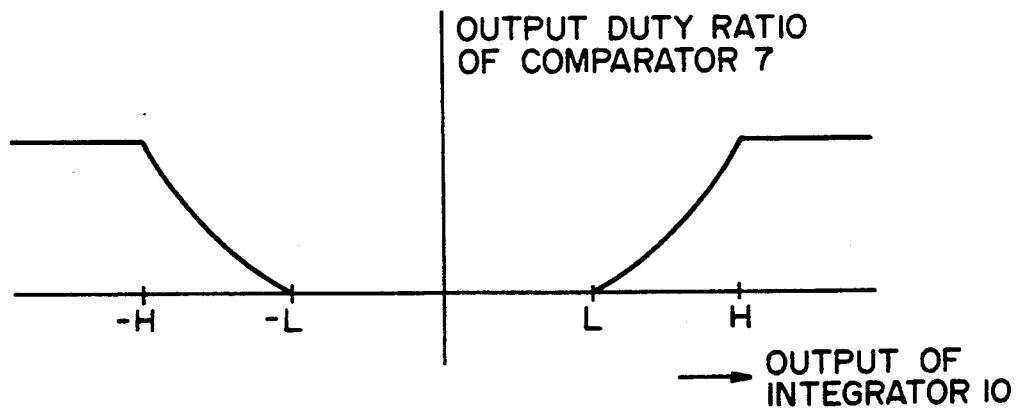
FIG. 39B is a chart showing the relationship between the output of an absolute value circuit and the duty ratio of pulse signal.

FIG. 39A shows the output wave form of an oscillator with such another output wave form, and FIG. 39B shows the duty ratio of the pulse signal when the above-mentioned wave form is employed for controlling the analog switch, depending on the output of the absolute value circuit. The cut-off frequency of the integrator will show a similar behavior.

As explained in the foregoing, the vibration detecting apparatus of the present embodiment is featured by varying the function characteristic of a CR resonance circuit determining the cut-off frequency of the integrator by on/off connection of a resistor connected parallel to said CR resonance circuit, utilizing a pulse signal with variable duty ratio, thereby substantially continuously varying the cut-off frequency of said integrator. It is therefore rendered possible to prevent prolonged saturation of the integrators and to always achieve exact detection of vibration rapidly. Because of these reasons there can be advantageously provided an apparatus for preventing image vibration caused by hand shaking in a camera.

Also the vibration detecting apparatus of the present embodiment is easily adaptable to integrated circuits, is less expensive in cost and is stable for a prolonged period, in comparison with the foregoing embodiments employing CdS photocouplers.

What is claimed is:

1. An apparatus for producing an output signal representative of the vibration state of an object, comprising:
   integration means for producing the output signal by integrating over an integrable frequency range a signal that represents the vibration state of the object, said integration means having varying means for varying a lower limit of the integrable frequency range within a first frequency range, wherein the integrating characteristic of said integration means is maintained constant in the portion of the integrable frequency range that exceeds said lower limit of the integrable frequency range; and control means for controlling said varying means in response to the output signal from said integration means.

2. An apparatus according to claim 1, wherein said control means includes a window comparator operating in response to the output signal from said integration means.

3. An apparatus according to claim 1, wherein said control means includes a differential window comparator operating in response to the output signal from said integration means.

4. An apparatus according to claim 1, further comprising:

second integration means for producing a second output signal representative of the vibration state of the object by integrating over a second integrable frequency range the output signal from said integration means, said second integration means having second varying means for varying the lower limit of the integrable frequency range within a second frequency range, wherein the integrating characteristic of said second integration means is maintained constant in the portion of the integrable frequency range that exceeds said lower limit of the integrable frequency range; and second control means for controlling said second varying means in response to the second output signal from said second integration means.

5. An apparatus according to claim 4, wherein said second control means includes means for controlling said varying means.

6. An apparatus according to claim 1, wherein said control means operates said varying means when the output signal level of said integration means becomes greater than a predetermined range.

7. An apparatus according to claim 1, wherein said control means controls said varying means so that said lower limit shifts to a higher frequency when the amplitude of the output signal of said integration means is increasing.

8. An apparatus according to claim 7, wherein said control means controls said varying means so that the lower limit continuously changes to a higher frequency when the amplitude of the output signal from said integration means is continuously increasing.

9. An apparatus according to claim 1, wherein said control means controls said varying means so that said lower limit gradually varies when the amplitude of the output signal from said integration means gradually varies.

10. An apparatus according to claim 4, further comprising third control means for controlling said varying means in response to the second output signal from said second integration means.

11. An apparatus according to claim 1, wherein said control means also is responsive to another integration means connected serially to the output of said integration means.

12. An apparatus according to claim 1, wherein said control means includes absolute value responding means and wherein said control means controls said varying means in response to the absolute value of a signal functionally related to the output of said integration means.

13. An apparatus according to claim 1, wherein said control means controls said varying means according to a pulse signal whose duty ratio varies in accordance with desired output characteristics of said integration means.

* * * * *

UNITED STATES PATENT AND TRADEMARK OFFICE
CERTIFICATE OF CORRECTION

PATENT NO. : 5,099,694
DATED : March 31, 1992
INVENTOR(S) : Sumio et al.

It is certified that error appears in the above-identified patent and that said Letters Patent is hereby corrected as shown below:

COLUMN 7:

Line 25, "the range" should read --the output voltage 36 if said output is in a predetermined range--.

COLUMN 8:

Line 14, "+$V_{th}$." should read --+$V_{th}$,--.

COLUMN 10:

Line 19, "t" should read --to--.

COLUMN 12:

Line 41, "characteristic" should read --characteristics--.

COLUMN 22:

Line 1, "becomes" should read --is outside--; and
Line 2, "greater than" should be deleted.

Signed and Sealed this

Second Day of November, 1993

Attest:

BRUCE LEHMAN

Attesting Officer     Commissioner of Patents and Trademarks